(12) United States Patent
Chen et al.

(10) Patent No.: US 12,405,447 B2
(45) Date of Patent: Sep. 2, 2025

(54) IMAGING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Chun-Yen Chen, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 667 days.

(21) Appl. No.: 17/747,988

(22) Filed: May 18, 2022

(65) Prior Publication Data

US 2023/0288669 A1    Sep. 14, 2023

(30) Foreign Application Priority Data

Mar. 9, 2022 (TW) ................................. 111108541

(51) Int. Cl.
*G02B 9/64*  (2006.01)
*G02B 3/04*  (2006.01)
*G02B 13/00* (2006.01)

(52) U.S. Cl.
CPC ................ *G02B 9/64* (2013.01); *G02B 3/04* (2013.01); *G02B 13/0045* (2013.01)

(58) Field of Classification Search
CPC ........ G02B 9/64; G02B 3/04; G02B 13/0045; G02B 9/62; G02B 13/006; G02B 13/18; G02B 13/06; G03B 30/00
See application file for complete search history.

(56) References Cited

U.S. PATENT DOCUMENTS 4,867,546 A    9/1989 Nishioka et al.
5,547,457 A    8/1996 Tsuyuki et al.
(Continued)

FOREIGN PATENT DOCUMENTS

CN    110007437 A    7/2019
CN    111025573 A    4/2020
(Continued)

OTHER PUBLICATIONS

IPO Office Action dated Jun. 24, 2024 in application No. 202334014230.
(Continued)

*Primary Examiner* — Charles S Chang
(74) *Attorney, Agent, or Firm* — Maschoff Brennan

(57) ABSTRACT

An imaging optical lens system includes seven lens elements which are, in order from an object side to an image side along an optical path: a first lens element, a second lens element, a third lens element, a fourth lens element, a fifth lens element, a sixth lens element and a seventh lens element. Each of the seven lens elements has an object-side surface facing toward the object side and an image-side surface facing toward the image side. The second lens element with negative refractive power has the object-side surface being concave in a paraxial region thereof, and at least one lens surface of the second lens element is aspheric. The image-side surface of the sixth lens element is concave in a paraxial region thereof. The imaging optical lens system further includes an aperture stop located between the second lens element and the third lens element.

26 Claims, 30 Drawing Sheets

(56) References Cited

U.S. PATENT DOCUMENTS

| | | | |
|---|---|---|---|
| 8,331,041 B2 | 12/2012 | Katakura et al. | |
| 9,930,254 B2 | 3/2018 | Satoh | |
| 11,125,971 B2 | 9/2021 | Chen et al. | |
| 11,125,974 B2 | 9/2021 | Wei et al. | |
| 11,194,129 B2 | 12/2021 | Fuse | |
| 2012/0133802 A1 | 5/2012 | Katakura et al. | |
| 2013/0215523 A1* | 8/2013 | Katakura | A61B 1/307 359/754 |
| 2016/0266359 A1 | 9/2016 | Amano et al. | |
| 2021/0199933 A1* | 7/2021 | Wang | G02B 13/18 |
| 2021/0325647 A1 | 10/2021 | Gao et al. | |
| 2021/0373284 A1* | 12/2021 | Wang | H04N 23/54 |
| 2022/0099927 A1 | 3/2022 | Yao et al. | |

FOREIGN PATENT DOCUMENTS

| | | |
|---|---|---|
| CN | 111929830 A | 11/2020 |
| CN | 112462501 A | 3/2021 |
| CN | 112630943 A | 4/2021 |
| CN | 112835183 A | 5/2021 |
| CN | 112882206 A | 6/2021 |
| CN | 113791489 B | 3/2022 |
| CN | 114114652 A | 3/2022 |
| CN | 114114655 A | 3/2022 |
| JP | H06-222263 A | 8/1994 |
| JP | 2016-218352 A | 12/2016 |
| WO | 2020/098384 A1 | 5/2020 |
| WO | 2021/109677 A1 | 6/2021 |
| WO | 2021/190312 A1 | 9/2021 |
| WO | 2022174459 A1 | 8/2022 |

OTHER PUBLICATIONS

TW Office Action in Application No. 111108541 Dated Oct. 5, 2022.

European Search Report dated Feb. 14, 2023 as received in application No. 22176010.1.

* cited by examiner

IMAGING OPTICAL LENS SYSTEM, IMAGE CAPTURING UNIT AND ELECTRONIC DEVICE

RELATED APPLICATIONS

This application claims priority to Taiwan Application 111108541, filed on Mar. 9, 2022, which is incorporated by reference herein in its entirety.

BACKGROUND

Technical Field

The present disclosure relates to an imaging optical lens system, an image capturing unit and an electronic device, more particularly to an imaging optical lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an imaging optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The second lens element has negative refractive power, the object-side surface of the second lens element is concave in a paraxial region thereof, and at least one of the object-side surface and the image-side surface of the second lens element is aspheric. The image-side surface of the sixth lens element is concave in a paraxial region thereof. The imaging optical lens system further comprises an aperture stop located between the second lens element and the third lens element.

When a focal length of the imaging optical lens system is f, a focal length of the first lens element is f1, and an axial distance between the second lens element and the third lens element is T23, the following conditions are satisfied:

$-2.50 < f/f1 < 0.15$; and $0.15 < T23/f < 2.30$.

According to another aspect of the present disclosure, an imaging optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has negative refractive power. The second lens element has negative refractive power. The sixth lens element has negative refractive power. The imaging optical lens system further includes an aperture stop located between the second lens element and the third lens element.

When a central thickness of the first lens element is CT1, a sum of central thicknesses of all lens elements of the imaging optical lens system is ΣCT, an axial distance between the second lens element and the third lens element is T23, a focal length of the imaging optical lens system is f, a curvature radius of the object-side surface of the second lens element is R3, and a curvature radius of the image-side surface of the second lens element is R4, the following conditions are satisfied:

$0.00 < CT1/\Sigma CT < 0.30$;

$0.15 < T23/f < 2.30$; and $-5.75 < (R3+R4)/(R3-R4) < 0.90$.

According to another aspect of the present disclosure, an imaging optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element has negative refractive power. The second lens element has negative refractive power. The sixth lens element has negative refractive power, the object-side surface of the sixth lens element is concave in a paraxial region thereof, and the image-side surface of the sixth lens element is concave in a paraxial region thereof. The imaging optical lens system further includes an aperture stop located between the second lens element and the third lens element.

When a central thickness of the sixth lens element is CT6, a central thickness of the seventh lens element is CT7, a focal length of the imaging optical lens system is f, an axial distance between the first lens element and the second lens element is T12, an axial distance between the second lens element and the third lens element is T23, a curvature radius of the object-side surface of the fourth lens element is R7, and a curvature radius of the image-side surface of the fourth lens element is R8, the following conditions are satisfied:

$0.00 < (CT6+CT7)/f < 1.20$;

$0.15 < T23/T12 < 1.80$; and $(R7+R8)/(R7-R8) < 2.50$.

According to another aspect of the present disclosure, an image capturing unit includes one of the aforementioned imaging optical lens systems and an image sensor, wherein the image sensor is disposed on an image surface of the imaging optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An imaging optical lens system includes seven lens elements. The seven lens elements are, in order from an object side to an image side along an optical path, a first lens element, a second lens element, a third lens element, a fourth lens element, a fifth lens element, a sixth lens element and a seventh lens element. Each of the seven lens elements has an object-side surface facing toward the object side and an image-side surface facing toward the image side.

The first lens element can have negative refractive power. Therefore, it is favorable for increasing the field of view so as to obtain a large range of image information.

Figure 27:
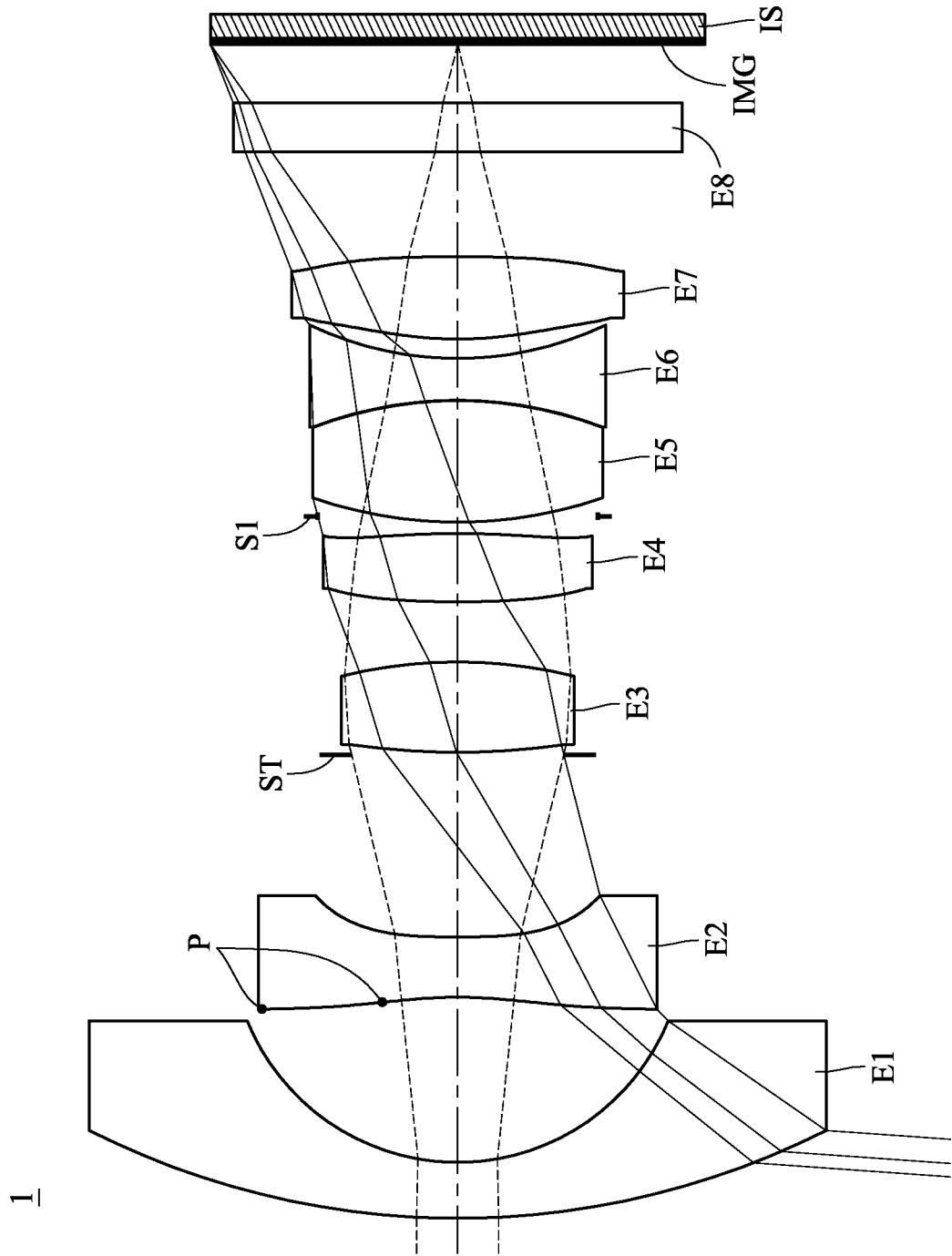
FIG. 27 shows a schematic view of inflection points of the second lens element according to the 1st embodiment of the present disclosure.

The second lens element has negative refractive power. Therefore, it is favorable for reducing the size of the first lens element and the second lens element of the imaging optical lens system. The second lens element can be made of plastic material. Therefore, it is favorable for increasing design flexibility of lens elements so as to achieve detailed recognition. The object-side surface of the second lens element can be concave in a paraxial region thereof. Therefore, it is favorable for adjusting the light travelling direction, thereby increasing the image surface. At least one of the object-side surface and the image-side surface of the second lens element can be aspheric. Therefore, it is favorable for increasing relative illuminance on the periphery of the field of view and increasing convergence quality of light at different wavelengths. At least one of the object-side surface and the image-side surface of the second lens element can have at least one inflection point. Therefore, it is favorable for correcting aberrations on the periphery of the field of view. Moreover, the object-side surface of the second lens element can has at least one inflection point. Please refer to FIG. 27, which shows a schematic view of inflection points P of the object-side surface of the second lens element E2 according to the 1st embodiment of the present disclosure. The abovementioned inflection points on the second lens element in FIG. 27 are only exemplary. Each of lens surfaces in various embodiments of the present disclosure may also have one or more inflection points.

The sixth lens element can have negative refractive power. Therefore, it is favorable for adjusting the refractive power of the sixth lens element so as to combine the fifth lens element with the sixth lens element for reducing convergence position difference of light at different wavelengths. The object-side surface of the sixth lens element can be concave in a paraxial region thereof. Therefore, it is favorable for adjusting the lens shape of the object-side surface of the sixth lens element so as to combine the fifth lens element with the sixth lens element for correcting chromatic aberration. The image-side surface of the sixth lens element can be concave in a paraxial region thereof. Therefore, it is favorable for adjusting the lens shape of the image-side surface of the sixth lens element so as to reduce the back focal length.

According to the present disclosure, the imaging optical lens system further includes an aperture stop located between the second lens element and the third lens element. Therefore, it is favorable for adjusting the position of the aperture stop in the imaging optical lens system, thereby increasing the field of view and the size of the aperture.

According to the present disclosure, the imaging optical lens system can be applied to the visible spectrum and the infrared spectrum (the infrared spectrum may be within wavelengths ranging from 900 to 960 nanometers, but the present disclosure is not limited thereto). Therefore, it is favorable for having similar focus positons of light at different wavelengths.

According to the present disclosure, the imaging optical lens system can be used with a band-pass filter. Therefore, it is favorable for applying the imaging optical lens system to light at different wavelengths.

According to the present disclosure, the imaging optical lens system can be applied to a vehicle device such as an automobile. Therefore, it is favorable for using the imaging optical lens system to observe driver's and passenger's situation in the vehicle device.

When a focal length of the imaging optical lens system is f, and a focal length of the first lens element is f1, the following condition can be satisfied: $-2.50 < f/f1 < 0.15$. Therefore, it is favorable for adjusting the refractive power of the first lens element so as to reduce the size of light spot at the center of the field of view. Moreover, the following condition can also be satisfied: $-2.20 < f/f1 < 0.00$.

When an axial distance between the second lens element and the third lens element is T23, and the focal length of the imaging optical lens system is f, the following condition can be satisfied: $0.15 < T23/f < 2.30$. Therefore, it is favorable for adjusting the ratio of the lens distance between the second lens element and the third lens element to the focal length, thereby properly distributing the size and reducing assembly error. Moreover, the following condition can also be satisfied: $0.30 < T23/f < 1.50$. Moreover, the following condition can also be satisfied: $0.40 < T23/f < 1.15$.

When a central thickness of the first lens element is CT1, and a sum of central thicknesses of all lens elements of the imaging optical lens system is $\Sigma CT$, the following condition can be satisfied: $0.00 < CT1/\Sigma CT < 0.30$. Therefore, it is favorable for adjusting the ratio of the thickness of the first lens element to the thickness sum of all lens elements, thereby obtaining a proper balance in increasing of the field of view and the total track length of lens elements. Moreover, the following condition can also be satisfied: $0.10 < CT1/\Sigma CT < 0.25$.

When a curvature radius of the object-side surface of the second lens element is R3, and a curvature radius of the image-side surface of the second lens element is R4, the following condition can be satisfied: $-5.75 < (R3+R4)/(R3-R4) < 0.90$. Therefore, it is favorable for adjusting the lens shape and the refractive power of the second lens element, thereby reducing the effective radius of the second lens element. Moreover, the following condition can also be satisfied: $-5.00 < (R3+R4)/(R3-R4) < 0.50$.

When a central thickness of the sixth lens element is CT6, a central thickness of the seventh lens element is CT7, and the focal length of the imaging optical lens system is f, the following condition can be satisfied: $0.00 < (CT6+CT7)/f < 1.20$. Therefore, it is favorable for adjusting the ratio of the thickness sum of the sixth lens element and the seventh lens element to the focal length, thereby reducing the back focal length. Moreover, the following condition can also be satisfied: $0.20 < (CT6+CT7)/f < 1.00$.

When an axial distance between the first lens element and the second lens element is T12, and the axial distance between the second lens element and the third lens element is T23, the following condition can be satisfied: $0.20 < T23/T12 < 5.00$. Therefore, it is favorable for adjusting the ratio of the lens distance between the second lens element and the third lens element to the lens distance between the first lens element and the second lens element, thereby adjusting lens distribution and balancing size distribution of the imaging optical lens system. Moreover, the following condition can also be satisfied: $0.15 < T23/T12 < 1.80$. Moreover, the following condition can also be satisfied: $0.30 < T23/T12 < 1.50$.

When a curvature radius of the object-side surface of the fourth lens element is R7, and a curvature radius of the image-side surface of the fourth lens element is R8, the following condition can be satisfied: $(R7+R8)/(R7-R8) < 2.50$. Therefore, it is favorable for adjusting the lens shape and the refractive power of the fourth lens element, thereby increasing light convergence quality at the central area of the fourth lens element. Moreover, the following condition can also be satisfied: $-5.00 < (R7+R8)/(R7-R8) < 2.10$.

When a curvature radius of the object-side surface of the first lens element is R1, and a curvature radius of the image-side surface of the first lens element is R2, the following condition can be satisfied: $-0.30 < (R1+R2)/(R1-R2) < 5.30$. Therefore, it is favorable for adjusting the lens shape and the refractive power of the first lens element, thereby increasing the field of view. Moreover, the following condition can also be satisfied: $0.2 < (R1+R2)/(R1-R2) < 4.5$.

When the focal length of the imaging optical lens system is f, and a focal length of the second lens element is f2, the following condition can be satisfied: $-2.30 < f/f2 < -0.2$. Therefore, it is favorable for adjusting the refractive power of the second lens element so as to combine the first lens element with the second lens element for reducing the effective radii of the first lens element and the second lens element.

When the focal length of the imaging optical lens system is f, and a composite focal length of the fifth lens element and the sixth lens element is f56, the following condition can be satisfied: $-1.00 < f/f56 < 0.20$. Therefore, it is favorable for adjusting the overall refractive power of the fifth and sixth lens elements so as to reduce astigmatism at the center and on the periphery of the field of view. Moreover, the following condition can also be satisfied: $-1.50 < f/f56 < 0.20$.

When an axial distance between the aperture stop and the image surface is SL, and an axial distance between the object-side surface of the first lens element and the image surface is TL, the following condition can be satisfied: $0.20 < SL/TL < 0.70$. Therefore, it is favorable for adjusting the ratio of the distance between the aperture stop and the image surface to the total track length of the imaging optical lens system, thereby reducing the overall size and increasing relative illuminance on the periphery of the field of view. Moreover, the following condition can also be satisfied: $0.45 < SL/TL < 0.70$.

When a curvature radius of the image-side surface of the fifth lens element is R10, and a curvature radius of the object-side surface of the sixth lens element is R11, the following condition can be satisfied: $0.80 < R10/R11 < 1.40$. Therefore, it is favorable for adjusting the ratio of the curvature radii of the image-side surface of the fifth lens element and the object-side surface of the sixth lens element, thereby reducing spherical aberration at the center and chromatic aberration on the periphery of the field of view.

When the focal length of the imaging optical lens system is f, and a focal length of the seventh lens element is f7, the following condition can be satisfied: −0.40<f/f7<0.40. Therefore, it is favorable for adjusting the refractive power of the seventh lens element so as to increase resolution at different wavelengths. Moreover, the following condition can also be satisfied: −0.28<f/f7<0.40.

When an axial distance between the aperture stop and the object-side surface of the third lens element is Dsr5, and an axial distance between the aperture stop and the image-side surface of the third lens element is Dsr6, the following condition can be satisfied: 0≤|Dsr5/Dsr6|<1.0. Therefore, it is favorable for effectively balancing the field of view and the total track length of the imaging optical lens system so as to meet the application requirements in the market. Moreover, the following condition can also be satisfied: 0≤|Dsr5/Dsr6|<0.50. Note that the value of Dsr5 or Dsr6 is positive when being defined in a direction from the object side to the image side and is negative when being defined in a direction from the image side to the object side. For example, if the aperture stop is located at an object side of the third lens element, Dsr5 and Dsr6 are positive; and if the aperture stop is located at an image side of the third lens element, Dsr5 and Dsr6 are negative.

When a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, and a refractive index of the i-th lens element is Ni, at least two lens elements of the imaging optical lens system can satisfy the following condition: 1.70<Ni, wherein i=1, 2, 3, 4, 5, 6 or 7. Therefore, it is favorable for adjusting the refractive index of the imaging optical lens system, thereby reducing the effective radius of lens elements located at an image side of the aperture stop so as to increase size utilization.

When a curvature radius of the object-side surface of the fifth lens element is R9, and the curvature radius of the image-side surface of the fifth lens element is R10, the following condition can be satisfied: −0.50<(R9+R10)/(R9−R10)<0.50. Therefore, it is favorable for adjusting the lens shape and the refractive power of the fifth lens element, thereby reducing chromatic aberration at different fields of view.

When the central thickness of the seventh lens element is CT7, and the focal length of the imaging optical lens system is f, the following condition can be satisfied: 0.10<CT7/f<0.80. Therefore, it is favorable for adjusting the ratio of the thickness of the seventh lens element to the focal length of the imaging optical lens system, thereby obtaining a proper balance in reduction of the back focal length and the total track length of the imaging optical lens system.

When a curvature radius of the object-side surface of the seventh lens element is R13, and a curvature radius of the image-side surface of the seventh lens element is R14, the following condition can be satisfied: −11.00<(R13+R14)/(R13−R14)<0.45. Therefore, it is favorable for adjusting the lens shape and the refractive power of the seventh lens element, thereby reducing the difference of focal lengths at different wavelengths. Moreover, the following condition can also be satisfied: −6.00<(R13+R14)/(R13−R14)<0.40.

When an f-number of the imaging optical lens system is FNO, the following condition can be satisfied: 1.85<FNO<3.50. Therefore, it is favorable for adjusting the ratio of the aperture size to the focal length so as to increase the amount of incident light into the imaging optical lens system, thereby obtaining better image quality at a dark place.

When the focal length of the imaging optical lens system is f, and a focal length of the fifth lens element is f5, the following condition can be satisfied: −0.10<f/f5<0.75. Therefore, it is favorable for adjusting the refractive power of the fifth lens element, thereby correcting chromatic aberration at the center and on the periphery of the field of view.

When the focal length of the imaging optical lens system is f, and the curvature radius of the object-side surface of the second lens element is R3, the following condition can be satisfied: −0.80<f/R3. Therefore, it is favorable for adjusting the ratio of the focal length to the central curvature radius of the object-side surface of the second lens element so as to receive light at a large field of view, thereby increasing the field of view and reducing the effective radius of the first lens element.

According to the present disclosure, the aforementioned features and conditions can be utilized in numerous combinations so as to achieve corresponding effects.

According to the present disclosure, the lens elements of the imaging optical lens system can be made of either glass or plastic material. When the lens elements are made of glass material, the refractive power distribution of the imaging optical lens system may be more flexible, the focal length of the imaging optical lens system may be more consistent at different temperatures, and the influence on imaging caused by external environment temperature change may be reduced. The glass lens element can either be made by grinding or molding. When the lens elements are made of plastic material, the manufacturing costs can be effectively reduced, and the length of the imaging optical lens system can be reduced. Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the imaging optical lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the imaging optical lens system, the image capturing unit and the electronic device are not specifically defined, these parameters may be determined according to the operating wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the imaging optical lens system, based on the corresponding image sensor, can be flat or curved, especially a curved surface being concave facing towards the object side of the imaging optical lens system.

According to the present disclosure, an image correction unit, such as a field flattener, can be optionally disposed between the lens element closest to the image side of the imaging optical lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 28:
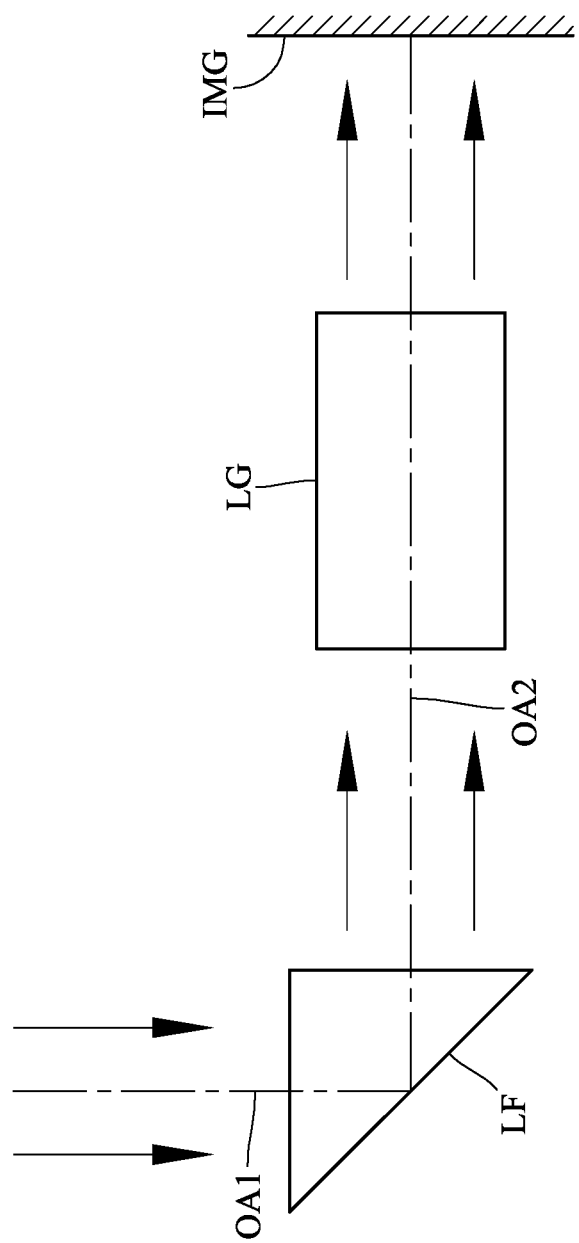
FIG. 28 shows a schematic view of a configuration of a light-folding element in an imaging optical lens system according to one embodiment of the present disclosure.
Figure 29:
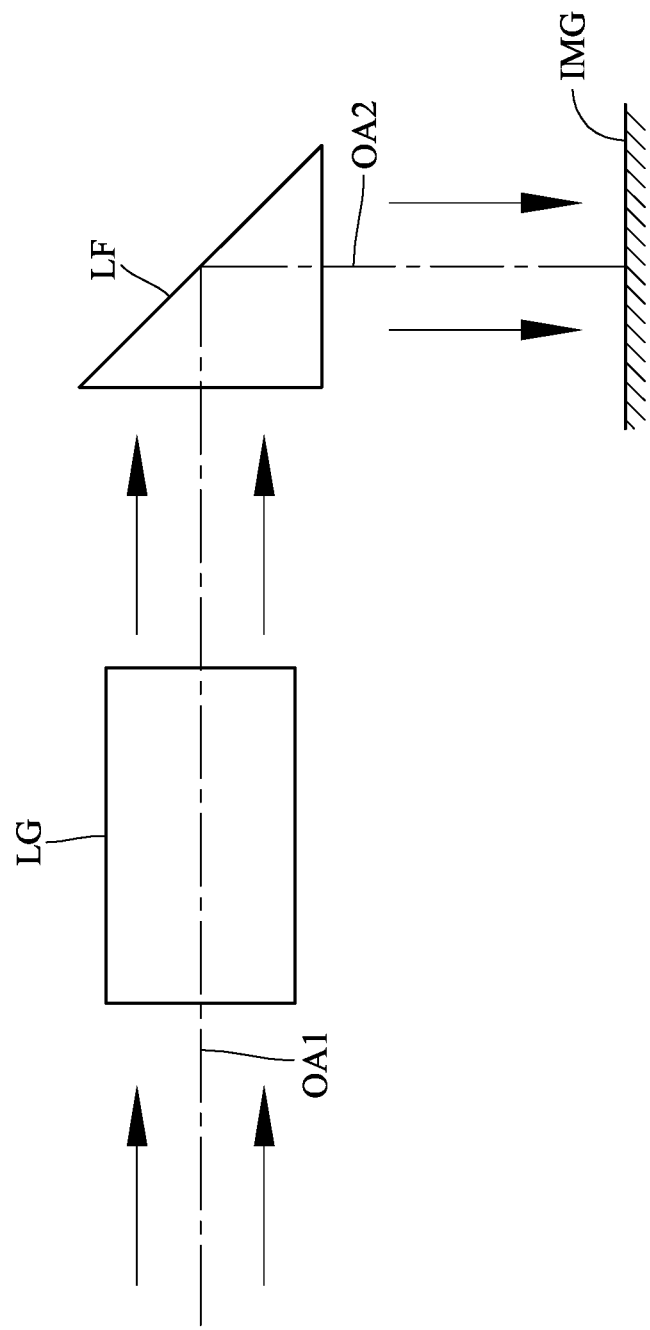
FIG. 29 shows a schematic view of another configuration of a light-folding element in an imaging optical lens system according to one embodiment of the present disclosure.
Figure 30:
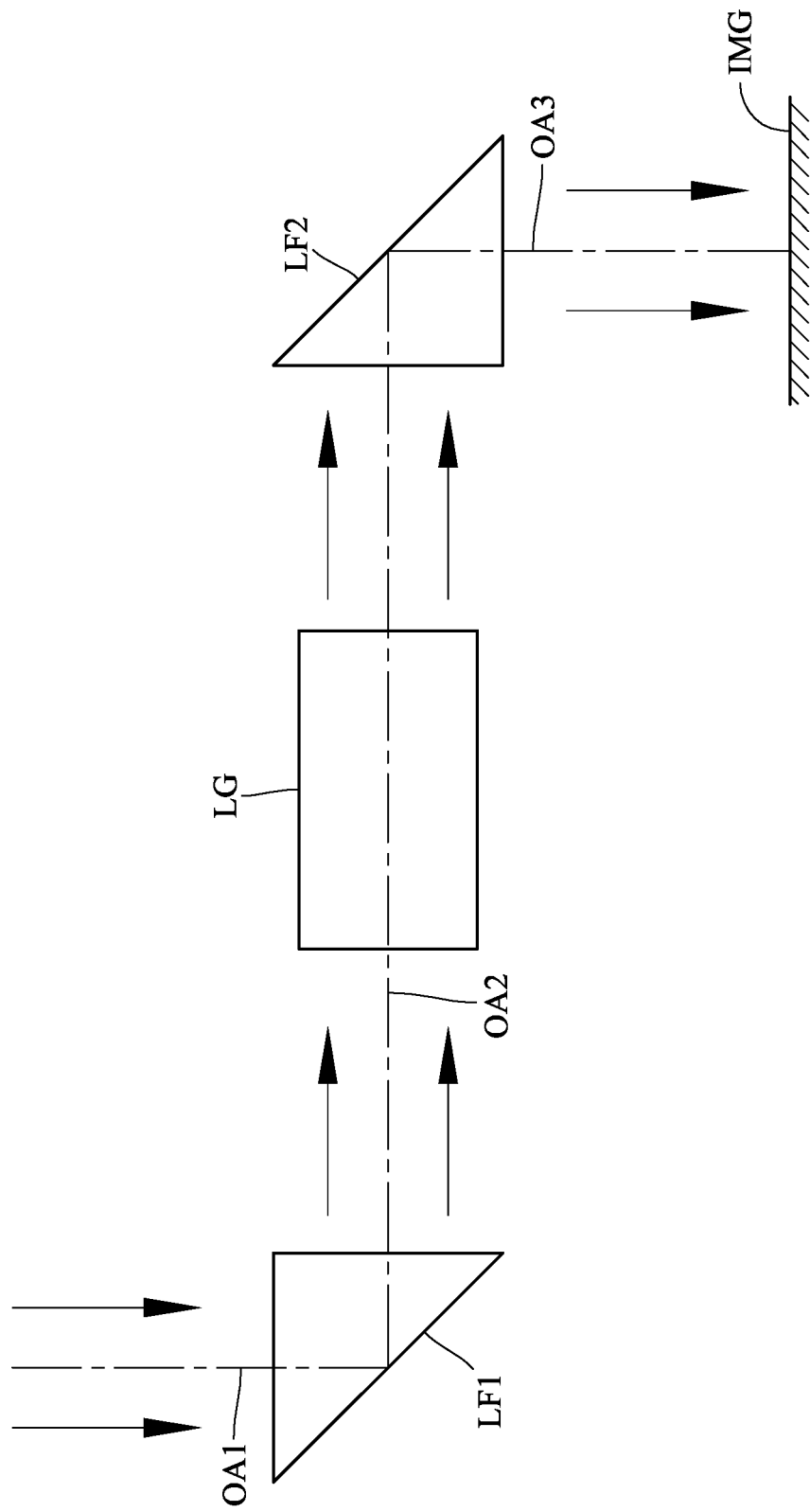
FIG. 30 shows a schematic view of a configuration of two light-folding elements in an imaging optical lens system according to one embodiment of the present disclosure.

According to the present disclosure, at least one light-folding element, such as a prism or a mirror, can be optionally disposed between an imaged object and the image surface on the imaging optical path, such that the imaging optical lens system can be more flexible in space arrangement, and therefore the dimensions of an electronic device is not restricted by the total track length of the imaging optical lens system. Specifically, please refer to FIG. 28 and FIG. 29. FIG. 28 shows a schematic view of a configuration of a light-folding element in an imaging optical lens system according to one embodiment of the present disclosure, and FIG. 29 shows a schematic view of another configuration of a light-folding element in an imaging optical lens system according to one embodiment of the present disclosure. In FIG. 28 and FIG. 29, the imaging optical lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the imaging optical lens system as shown in FIG. 28 or disposed between a lens group LG of the imaging optical lens system and the image surface IMG as shown in FIG. 29. Furthermore, please refer to FIG. 30, which shows a schematic view of a configuration of two light-folding elements in an imaging optical lens system according to one embodiment of the present disclosure. In FIG. 30, the imaging optical lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the imaging optical lens system, the second light-folding element LF2 is disposed between the lens group LG of the imaging optical lens system and the image surface IMG, and the travelling direction of light on the first optical axis OA1 can be the same direction as the travelling direction of light on the third optical axis OA3 as shown in FIG. 30. The imaging optical lens system can be optionally provided with three or more light-folding elements, and the present disclosure is not limited to the type, amount and position of the light-folding elements of the embodiments disclosed in the aforementioned figures.

According to the present disclosure, the imaging optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the imaging optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the imaging optical lens system and thereby provides a wider field of view for the same.

According to the present disclosure, the imaging optical lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
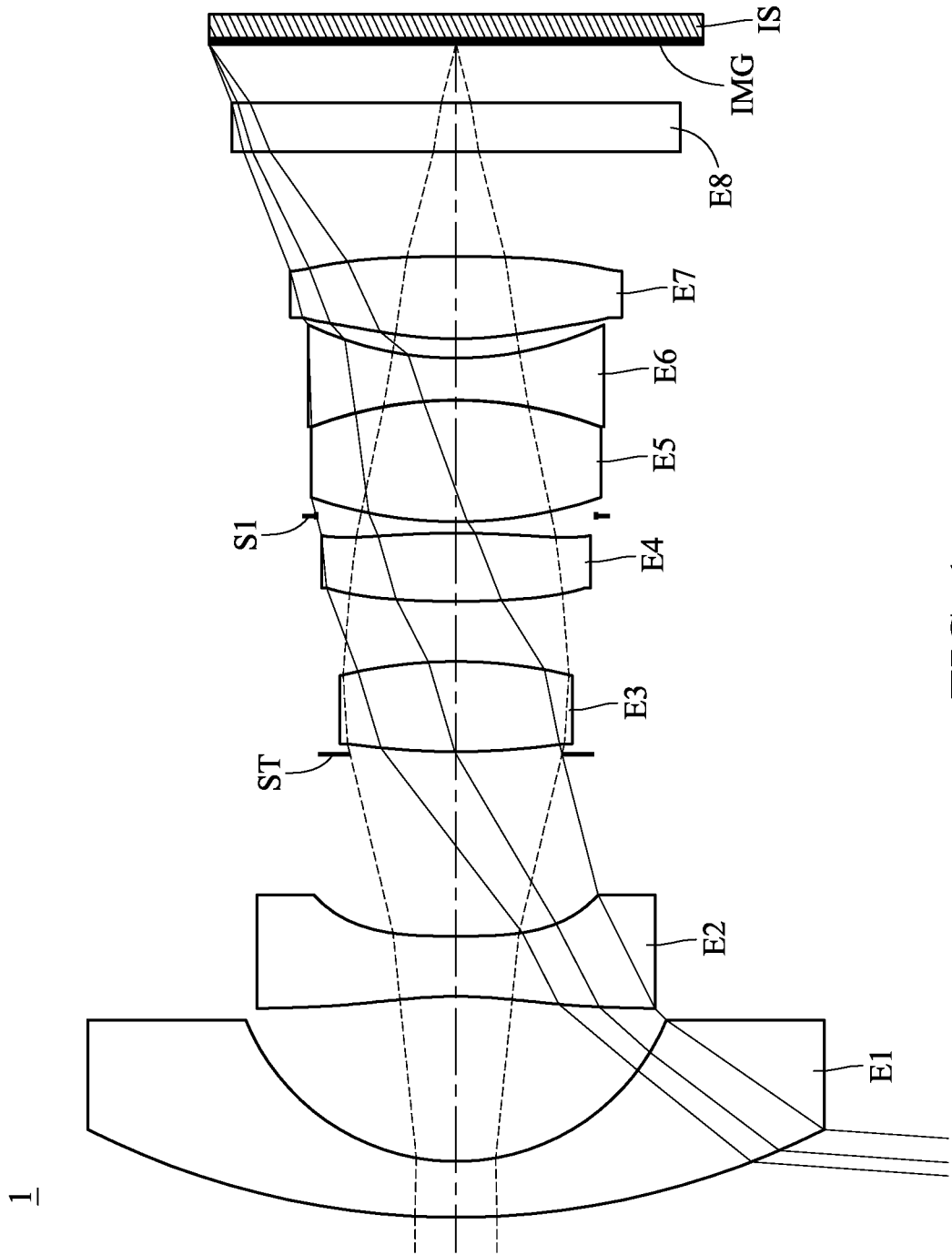
FIG. 1 is a schematic view of an image capturing unit according to the 1st embodiment of the present disclosure.
Figure 2:
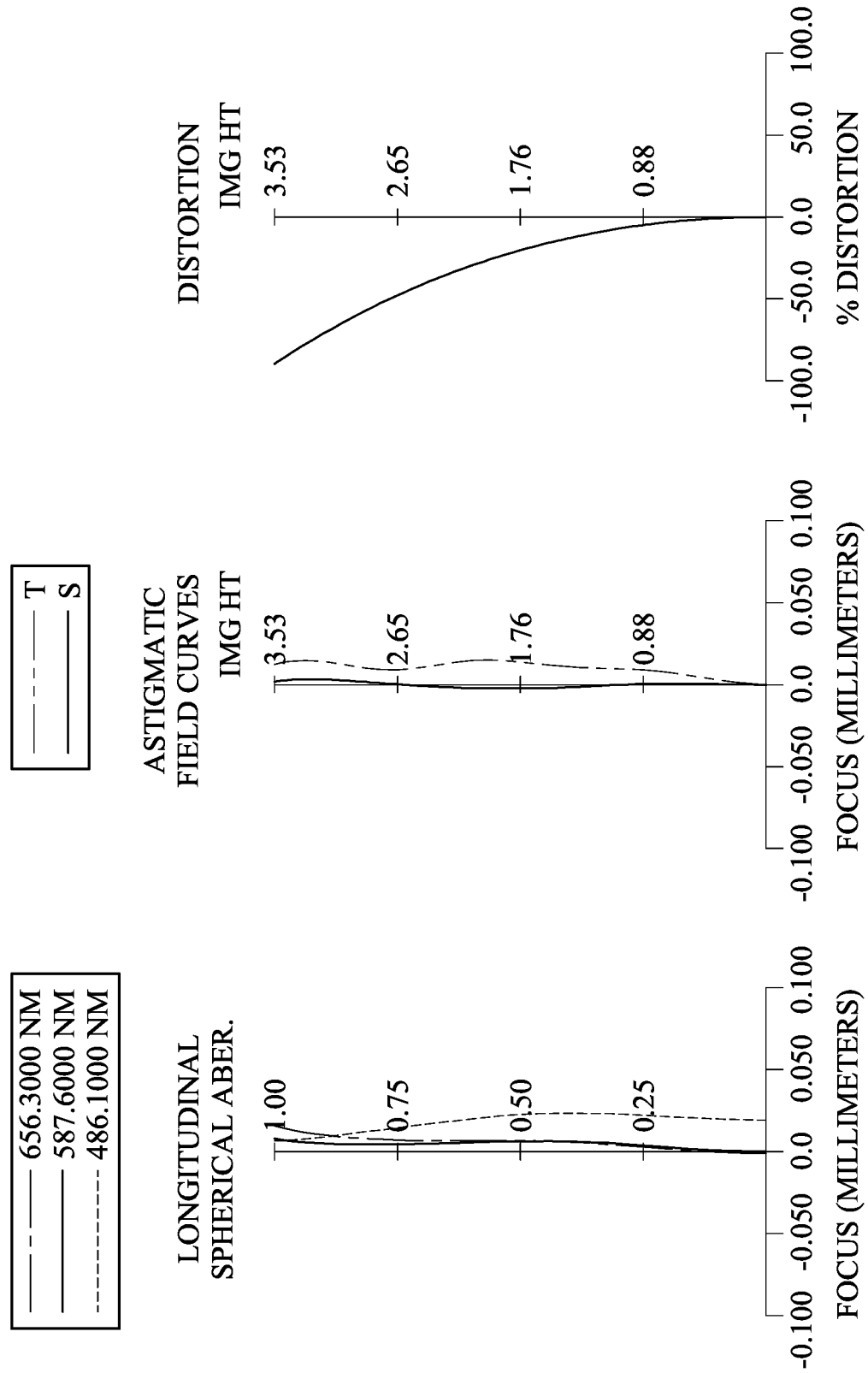
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being concave in a paraxial region thereof. The second lens element E2 is made of plastic material and has the object-side surface and the image-side surface being both aspheric. The object-side surface of the second lens element E2 has two inflection points.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical. The object-side surface of the sixth lens element E6 is cemented to the image-side surface of the fifth lens element E5.

The seventh lens element E7 with positive refractive power has an object-side surface being convex in a paraxial region thereof and an image-side surface being convex in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has one inflection point.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The equation of the aspheric surface profiles of the aforementioned lens elements of the 1st embodiment is expressed as follows:

$$X(Y) = (Y^2/R)/(1 + sqrt(1 - (1+k)\times(Y/R)^2)) + \sum_i (Ai)\times(Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging optical lens system of the image capturing unit according to the 1st embodiment, when a focal length of the imaging optical lens system is f, an f-number of the imaging optical lens system is FNO, and half of a maximum field of view of the imaging optical lens system is HFOV, these parameters have the following values: f=2.40 millimeters (mm), FNO=2.05, HFOV=85.9 degrees (deg.).

When a central thickness of the sixth lens element E6 is CT6, a central thickness of the seventh lens element E7 is CT7, and the focal length of the imaging optical lens system is f, the following condition is satisfied: (CT6+CT7)/f=0.74.

When a curvature radius of the object-side surface of the first lens element E1 is R1, and a curvature radius of the image-side surface of the first lens element E1 is R2, the following condition is satisfied: (R1+R2)/(R1−R2)=1.77.

When a curvature radius of the object-side surface of the second lens element E2 is R3, and a curvature radius of the image-side surface of the second lens element E2 is R4, the following condition is satisfied: (R3+R4)/(R3−R4)=−0.38.

When a curvature radius of the object-side surface of the fourth lens element E4 is R7, and a curvature radius of the image-side surface of the fourth lens element E4 is R8, the following condition is satisfied: (R7+R8)/(R7−R8)=0.06.

When a curvature radius of the object-side surface of the fifth lens element E5 is R9, and a curvature radius of the image-side surface of the fifth lens element E5 is R10, the following condition is satisfied: (R9+R10)/(R9−R10)=0.05.

When a curvature radius of the object-side surface of the seventh lens element E7 is R13, and a curvature radius of the image-side surface of the seventh lens element E7 is R14, the following condition is satisfied: (R13+R14)/(R13−R14)=−0.66.

When a central thickness of the first lens element E1 is CT1, and a sum of central thicknesses of all lens elements of the imaging optical lens system is ΣCT, the following condition is satisfied: CT1/ΣCT=0.11. In this embodiment, ΣCT is a sum of central thicknesses of the first lens element E1, the second lens element E2, the third lens element E3, the fourth lens element E4, the fifth lens element E5, the sixth lens element E6, and the seventh lens element E7.

When the central thickness of the seventh lens element E7 is CT7, and the focal length of the imaging optical lens system is f, the following condition is satisfied: CT7/f=0.49.

When the focal length of the imaging optical lens system is f, and a focal length of the first lens element E1 is f1, the following condition is satisfied: f/f1=−0.41.

When the focal length of the imaging optical lens system is f, and a focal length of the second lens element E2 is f2, the following condition is satisfied: f/f2=−0.31.

When the focal length of the imaging optical lens system is f, and a focal length of the fifth lens element E5 is f5, the following condition is satisfied: f/f5=0.54.

When the focal length of the imaging optical lens system is f, and a focal length of the seventh lens element E7 is f7, the following condition is satisfied: f/f7=0.30.

When the focal length of the imaging optical lens system is f, and a composite focal length of the fifth lens element E5 and the sixth lens element E6 is f56, the following condition is satisfied: f/f56=−0.18.

When the focal length of the imaging optical lens system is f, and the curvature radius of the object-side surface of the second lens element E2 is R3, the following condition is satisfied: f/R3=−0.38.

When a refractive index of the first lens element E1 is N1, a refractive index of the second lens element E2 is N2, a refractive index of the third lens element E3 is N3, a refractive index of the fourth lens element E4 is N4, a refractive index of the fifth lens element E5 is N5, a refractive index of the sixth lens element E6 is N6, and a refractive index of the seventh lens element E7 is N7, the following conditions are satisfied: N1=1.804; N2=1.544; N3=1.800; N4=1.534; N5=1.729; N6=1.923; and N7=1.544.

When the curvature radius of the image-side surface of the fifth lens element E5 is R10, and a curvature radius of the object-side surface of the sixth lens element E6 is R11, the following condition is satisfied: R10/R11=1.00.

When an axial distance between the aperture stop ST and the image surface IMG is SL, and an axial distance between the object-side surface of the first lens element E1 and the image surface IMG is TL, the following condition is satisfied: SL/TL=0.60. In this embodiment, an axial distance between two adjacent lens elements is a distance in a paraxial region between two adjacent lens surfaces of the two adjacent lens elements.

When an axial distance between the second lens element E2 and the third lens element E3 is T23, and the focal length of the imaging optical lens system is f, the following condition is satisfied: T23/f=1.10.

When an axial distance between the first lens element E1 and the second lens element E2 is T12, and the axial distance between the second lens element E2 and the third lens element E3 is T23, the following condition is satisfied: T23/T12=1.12.

When an axial distance between the aperture stop ST and the object-side surface of the third lens element E3 is Dsr5, and an axial distance between the aperture stop ST and the image-side surface of the third lens element E3 is Dsr6, the following condition is satisfied: |Dsr5/Dsr6|=0.02.

The detailed optical data of the 1st embodiment are shown in Table 1 and the aspheric surface data are shown in Table 2 below.

TABLE 1

1st Embodiment
f = 2.40 mm, FNO = 2.05, HFOV = 85.9 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 11.6574 | (SPH) | 0.800 | Glass | 1.804 | 39.6 | −5.84 |
| 2 |  | 3.2467 | (SPH) | 2.362 |  |  |  |  |
| 3 | Lens 2 | −6.2966 | (ASP) | 0.860 | Plastic | 1.544 | 56.0 | −7.84 |
| 4 |  | 13.8696 | (ASP) | 2.613 |  |  |  |  |
| 5 | Ape. Stop | Plano |  | 0.032 |  |  |  |  |
| 6 | Lens 3 | 10.8982 | (SPH) | 1.293 | Glass | 1.800 | 42.2 | 5.44 |
| 7 |  | −6.8576 | (SPH) | 0.861 |  |  |  |  |
| 8 | Lens 4 | 14.4509 | (ASP) | 0.977 | Plastic | 1.534 | 55.9 | 12.84 |
| 9 |  | −12.7359 | (ASP) | 0.248 |  |  |  |  |
| 10 | Stop | Plano |  | −0.086 |  |  |  |  |
| 11 | Lens 5 | 6.3573 | (SPH) | 1.738 | Glass | 1.729 | 54.7 | 4.41 |
| 12 |  | −5.7679 | (SPH) | 0.005 | Cemented | 1.550 | 43.9 | — |
| 13 | Lens 6 | −5.7679 | (SPH) | 0.600 | Glass | 1.923 | 18.9 | −2.80 |
| 14 |  | 4.9211 | (SPH) | 0.277 |  |  |  |  |
| 15 | Lens 7 | 5.2185 | (ASP) | 1.179 | Plastic | 1.544 | 56.0 | 8.06 |
| 16 |  | −25.1738 | (ASP) | 1.500 |  |  |  |  |
| 17 | Filter | Plano |  | 0.700 | Glass | 1.516 | 64.1 | — |
| 18 |  | Plano |  | 0.832 |  |  |  |  |
| 19 | Image | Plano |  | — |  |  |  |  |

Note:
Reference wavelength is 587.6 nm (d-line).
An effective radius of the stop S1 (Surface 10) is 2.000 mm.

TABLE 2

Aspheric Coefficients

| Surface # | 3 | 4 | 8 | 9 |
|---|---|---|---|---|
| k= | 1.09584000E+00 | 2.00675000E+01 | −5.22907000E+01 | 1.15381000E+01 |
| A4= | 1.89229230E−02 | 2.57042330E−02 | 5.03443540E−03 | 3.24463700E−03 |
| A6= | −2.82741710E−03 | −8.58143730E−04 | 1.00795150E−03 | 1.06419860E−03 |
| A8= | 3.72088990E−04 | −4.04561430E−04 | −1.60940150E−04 | 3.60148850E−04 |
| A10= | −3.55783090E−05 | 3.59119820E−04 | 2.91654290E−05 | −2.35684040E−04 |

TABLE 2-continued

Aspheric Coefficients

| A12= | 2.00622930E−06 | −9.42936970E−05 | 1.04414880E−05 | 9.01995490E−05 |
|---|---|---|---|---|
| A14= | −4.41807220E−08 | 1.27777050E−05 | −3.99705300E−06 | −1.63768710E−05 |
| A16= | −3.02865290E−10 | −7.56098130E−07 | 4.03689280E−07 | 1.23993980E−06 |

| Surface # | 15 | 16 |
|---|---|---|
| k= | −1.55918000E+00 | 5.96361000E+01 |
| A4= | −9.61400220E−03 | −3.35580750E−03 |
| A6= | 6.99865380E−04 | −1.06229540E−03 |
| A8= | −2.69653160E−04 | 6.89427820E−04 |
| A10= | 1.52557730E−04 | −2.48678920E−04 |
| A12= | −5.06255080E−05 | 5.41101340E−05 |
| A14= | 8.99788880E−06 | −6.42695070E−06 |
| A16= | −5.57634020E−07 | 3.55763920E−07 |

In Table 1, the curvature radius, the thickness and the focal length are shown in millimeters (mm). Surface numbers 0-19 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
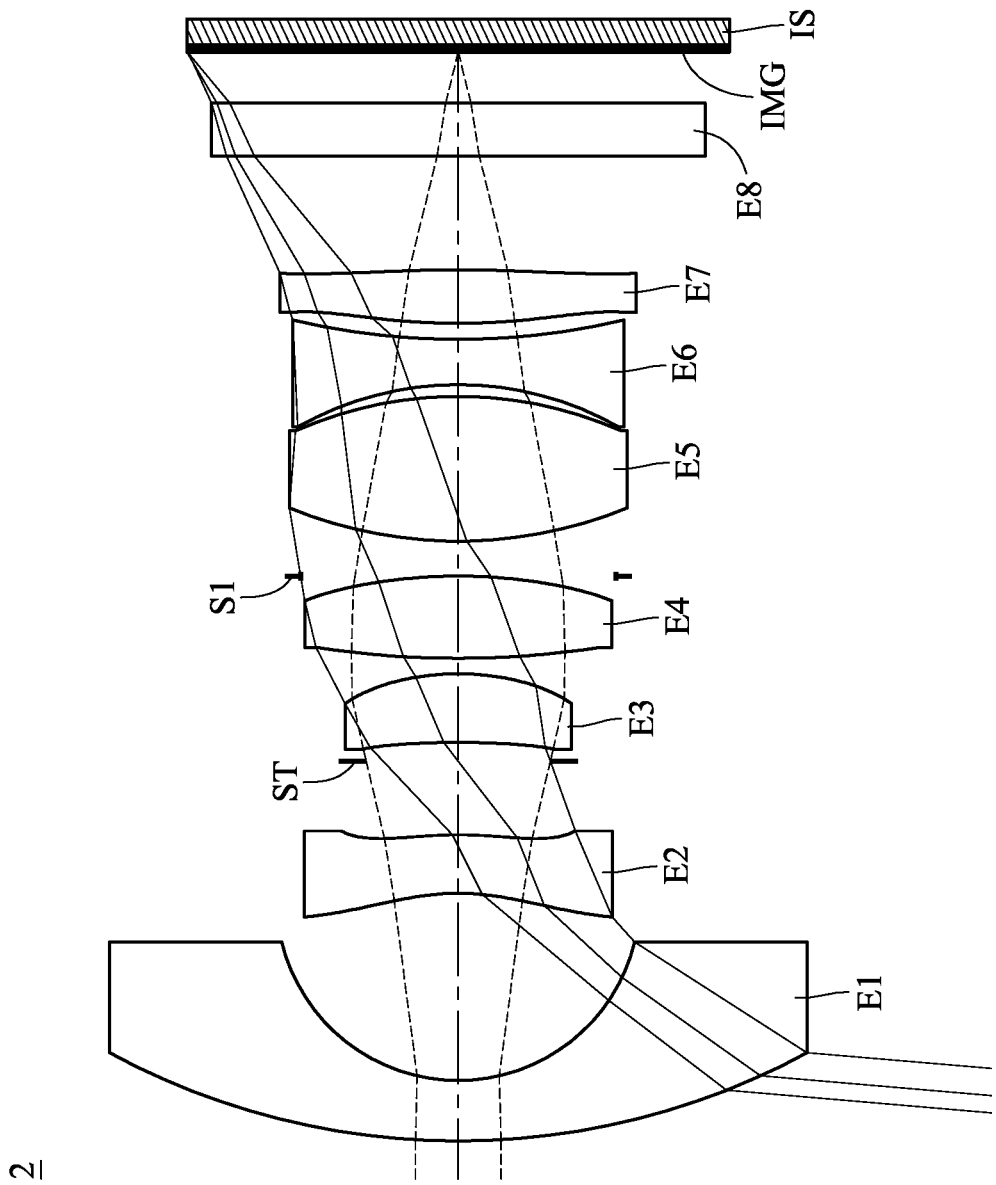
FIG. 3 is a schematic view of an image capturing unit according to the 2nd embodiment of the present disclosure.
Figure 4:
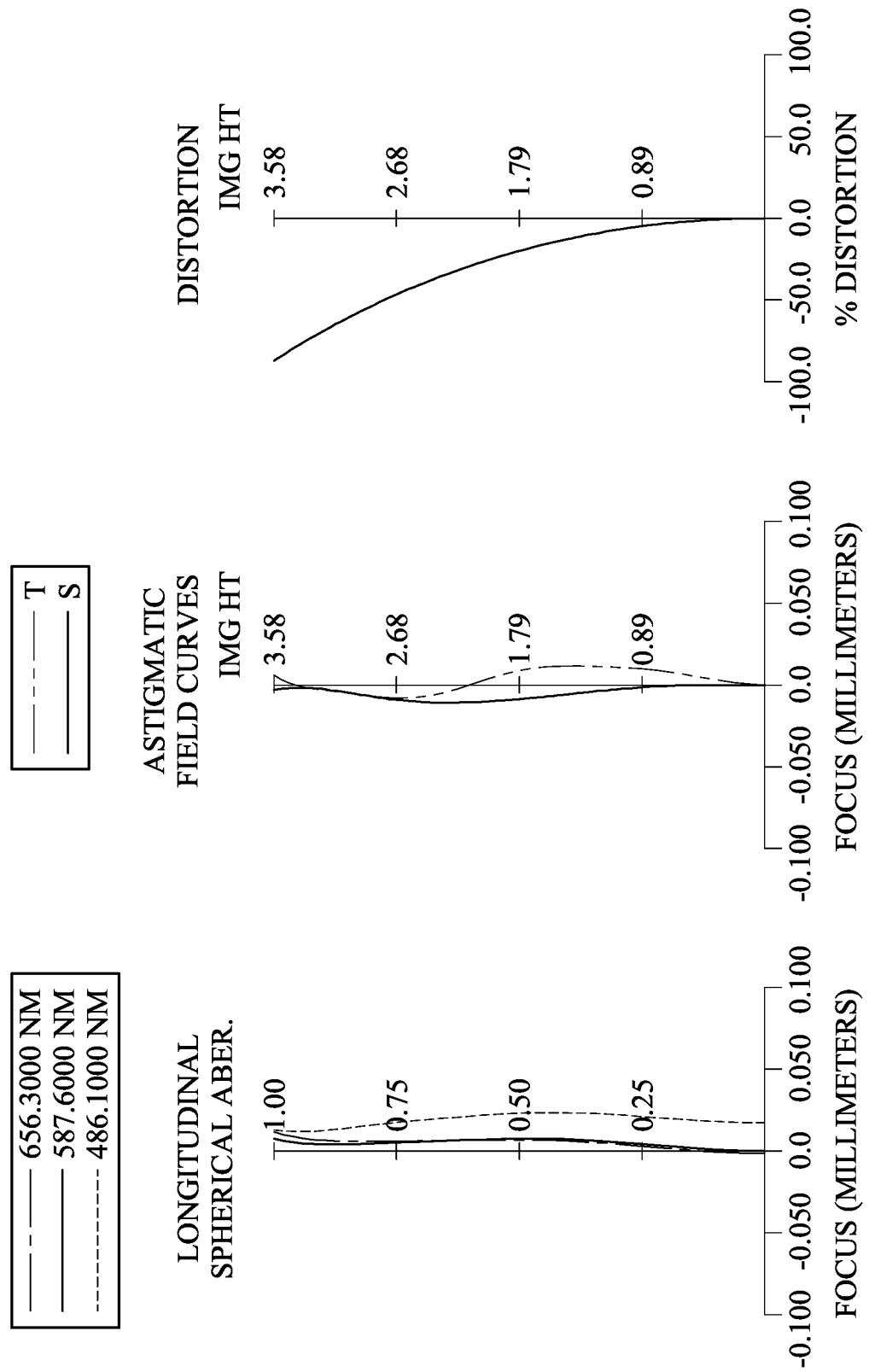
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with positive refractive power has an object-side surface being concave in a paraxial region thereof and an image-side surface being convex in a paraxial region thereof. The third lens element E3 is made of plastic material and has the object-side surface and the image-side surface being both aspheric.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being convex in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one critical point in an off-axis region thereof. The image-side surface of the seventh lens element E7 has one critical point in an off-axis region thereof.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 2nd embodiment are shown in Table 3 and the aspheric surface data are shown in Table 4 below.

TABLE 3

2nd Embodiment
f = 2.35 mm, FNO = 2.09, HFOV = 85.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.6707 | (SPH) | 0.800 | Glass | 1.734 | 51.5 | −4.56 |
| 2 | | 2.3978 | (SPH) | 2.474 | | | | |
| 3 | Lens 2 | −3.0758 | (ASP) | 0.772 | Plastic | 1.544 | 56.0 | −15.03 |
| 4 | | −5.3654 | (ASP) | 0.972 | | | | |
| 5 | Ape. Stop | Plano | | 0.251 | | | | |
| 6 | Lens 3 | −11.0613 | (ASP) | 0.907 | Plastic | 1.589 | 61.1 | 7.47 |
| 7 | | −3.2426 | (ASP) | 0.206 | | | | |
| 8 | Lens 4 | 19.9233 | (ASP) | 1.085 | Plastic | 1.534 | 55.9 | 9.31 |
| 9 | | −6.4966 | (ASP) | −0.002 | | | | |
| 10 | Stop | Plano | | 0.462 | | | | |
| 11 | Lens 5 | 5.8727 | (SPH) | 1.913 | Glass | 1.734 | 51.5 | 4.09 |
| 12 | | −5.3000 | (SPH) | 0.155 | | | | |
| 13 | Lens 6 | −4.2838 | (SPH) | 0.600 | Glass | 1.946 | 17.9 | −3.06 |
| 14 | | 9.5573 | (SPH) | 0.211 | | | | |
| 15 | Lens 7 | 8.6003 | (ASP) | 0.709 | Plastic | 1.566 | 37.4 | 9.70 |
| 16 | | −14.7405 | (ASP) | 1.500 | | | | |
| 17 | Filter | Plano | | 0.700 | Glass | 1.516 | 64.1 | — |
| 18 | | Plano | | 0.674 | | | | |
| 19 | Image | Plano | | — | | | | |

Note:
Reference wavelength is 587.6 nm (d-line).
An effective radius of the stop S1 (Surface 10) is 2.080 mm.

TABLE 4

Aspheric Coefficients

| Surface # | 3 | 4 | 6 | 7 |
|---|---|---|---|---|
| k= | −1.98516000E+00 | −2.86221000E+01 | 3.63892000E+01 | 5.90375000E−01 |
| A4= | 2.80031330E−02 | 2.37356480E−02 | 5.09947030E−03 | 2.15296460E−02 |
| A6= | −3.31878050E−03 | 6.48088060E−03 | −4.73644900E−03 | −2.51462490E−02 |
| A8= | 1.67062470E−04 | −6.96355220E−04 | −3.45617130E−04 | 1.22956650E−02 |
| A10= | 2.48346840E−05 | −1.99967890E−03 | 7.51218070E−04 | −4.08756030E−03 |
| A12= | −1.02097870E−05 | 2.24546180E−03 | −4.38367320E−04 | 7.52954200E−04 |
| A14= | 1.62670850E−06 | −9.05789520E−04 | 1.17294170E−04 | −5.30607700E−05 |
| A16= | −8.44613540E−08 | 1.41261240E−04 | — | — |

| Surface # | 8 | 9 | 15 | 16 |
|---|---|---|---|---|
| k= | −5.13379000E+01 | 7.35385000E+00 | 1.15161000E+01 | −8.75760000E+01 |
| A4= | 3.14243910E−02 | 8.43096400E−03 | −3.26138930E−03 | 4.73948300E−03 |
| A6= | −2.70442700E−02 | −9.56084810E−04 | −2.39903330E−03 | −1.96875700E−03 |
| A8= | 1.49343770E−02 | −1.97357900E−04 | 1.14365810E−03 | 1.52095830E−03 |
| A10= | −5.85986680E−03 | 1.50167130E−04 | −3.76174550E−04 | −5.58372690E−04 |
| A12= | 1.59455170E−03 | −4.19063660E−05 | −3.10564970E−05 | 6.62939790E−05 |
| A14= | −2.79325390E−04 | 1.05510500E−05 | 5.14215830E−05 | 1.22638070E−05 |
| A16= | 2.84567720E−05 | −1.73928320E−06 | −1.41306230E−05 | −4.75477450E−06 |
| A18= | −1.30132010E−06 | 1.59585550E−07 | 1.72817520E−06 | 5.57757480E−07 |
| A20= | — | — | −8.40478670E−08 | −2.36937430E−08 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.35 | f/f56 | 0.24 |
| FNO | 2.09 | f/R3 | −0.77 |
| HFOV [deg.] | 85.1 | N1 | 1.734 |
| (CT6 + CT7)/f | 0.56 | N2 | 1.544 |
| (R1 + R2)/(R1 − R2) | 1.66 | N3 | 1.589 |
| (R3 + R4)/(R3 − R4) | −3.69 | N4 | 1.534 |
| (R7 + R8)/(R7 − R8) | 0.51 | N5 | 1.734 |
| (R9 + R10)/(R9 − R10) | 0.05 | N6 | 1.946 |
| (R13 + R14)/(R13 − R14) | −0.26 | N7 | 1.566 |
| CT1/ΣCT | 0.12 | R10/R11 | 1.24 |
| CT7/f | 0.30 | SL/TL | 0.65 |
| f/f1 | −0.52 | T23/f | 0.52 |
| f/f2 | −0.16 | T23/T12 | 0.49 |
| f/f5 | 0.58 | |Dsr5/Dsr6| | 0.22 |
| f/f7 | −0.04 | — | — |

3rd Embodiment

Figure 5:
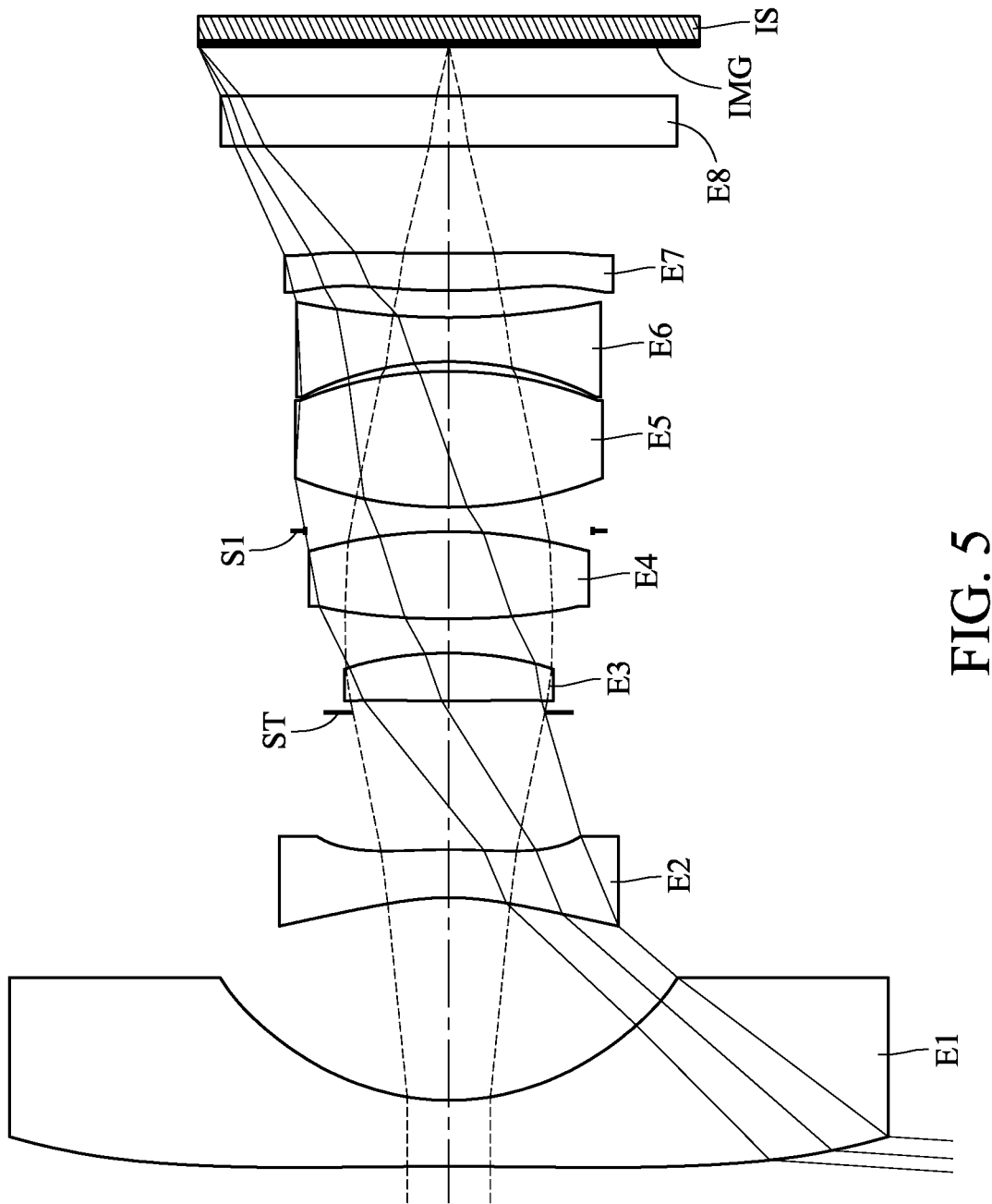
FIG. 5 is a schematic view of an image capturing unit according to the 3rd embodiment of the present disclosure.
Figure 6:
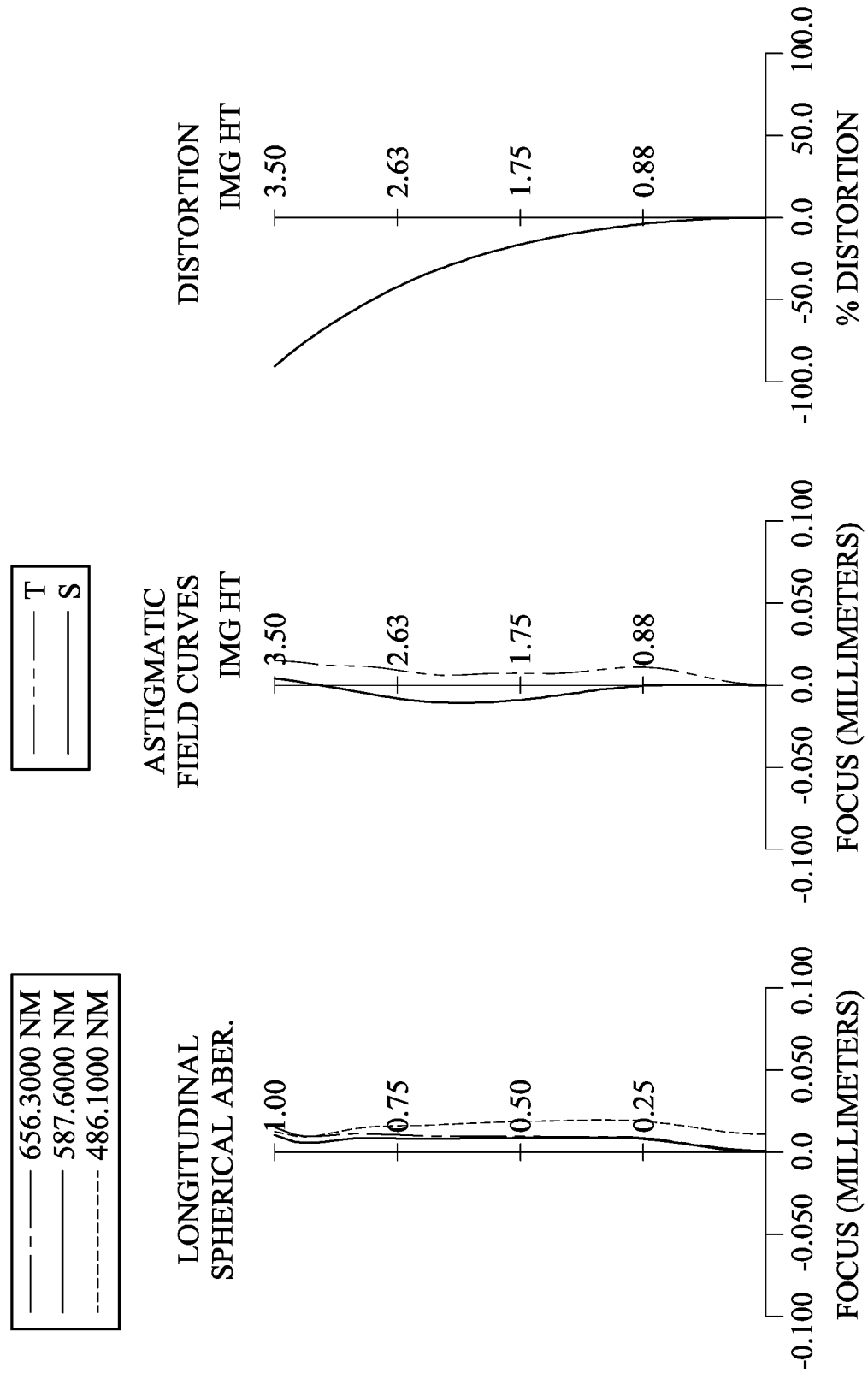
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being concave in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The object-side surface of the first lens element E1 has one critical point in an off-axis region thereof.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with positive refractive power has an object-side surface being concave in a paraxial region thereof and an image-side surface being convex in a paraxial region thereof. The third lens element E3 is made of glass material and has the object-side surface and the image-side surface being both aspheric. The object-side surface of the third lens element E3 has two inflection points. The object-side surface of the third lens element E3 has two critical points in an off-axis region thereof.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric. The image-side surface of the fourth lens element E4 has one inflection point.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has two critical points in an off-axis region thereof.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 3rd embodiment are shown in Table 5 and the aspheric surface data are shown in Table 6 below.

TABLE 5

3rd Embodiment
f = 2.49 mm, FNO = 2.15, HFOV = 86.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −82.4748 | (ASP) | 0.926 | Plastic | 1.583 | 59.5 | −5.85 |
| 2 | | 3.5729 | (ASP) | 2.832 | | | | |
| 3 | Lens 2 | −3.9119 | (ASP) | 0.672 | Plastic | 1.543 | 53.1 | −12.23 |
| 4 | | −10.0828 | (ASP) | 1.924 | | | | |
| 5 | Ape. Stop | Plano | | 0.161 | | | | |
| 6 | Lens 3 | −27102.5833 | (ASP) | 0.665 | Glass | 1.607 | 56.7 | 7.58 |
| 7 | | −4.6002 | (ASP) | 0.480 | | | | |
| 8 | Lens 4 | 14.8050 | (ASP) | 1.218 | Plastic | 1.534 | 55.9 | 8.91 |
| 9 | | −6.8095 | (ASP) | 0.010 | | | | |
| 10 | Stop | Plano | | 0.327 | | | | |
| 11 | Lens 5 | 5.7964 | (SPH) | 1.905 | Glass | 1.706 | 53.3 | 4.29 |
| 12 | | −5.4729 | (SPH) | 0.134 | | | | |
| 13 | Lens 6 | −4.5098 | (SPH) | 0.615 | Glass | 1.946 | 17.9 | −3.27 |
| 14 | | 10.4681 | (SPH) | 0.378 | | | | |
| 15 | Lens 7 | 9.8576 | (ASP) | 0.523 | Plastic | 1.614 | 26.0 | 16.58 |
| 16 | | 306.5509 | (ASP) | 1.500 | | | | |
| 17 | Filter | Plano | | 0.700 | Glass | 1.516 | 64.1 | — |

TABLE 5-continued

3rd Embodiment
f = 2.49 mm, FNO = 2.15, HFOV = 86.2 deg.

| Surface # | | Curvature Radius | Thickness | Material | Index | Abbe # | Focal Length |
|---|---|---|---|---|---|---|---|
| 18 | | Plano | 0.685 | | | | |
| 19 | Image | Plano | — | | | | |

Note:
Reference wavelength is 587.6 nm (d-line).
An effective radius of the stop S1 (Surface 10) is 2.010 mm.

TABLE 6

Aspheric Coefficients

| Surface # | 1 | 2 | 3 | 4 |
|---|---|---|---|---|
| k= | −8.18622000E+01 | −7.49126000E−02 | −2.97445000E−01 | −1.80964000E+01 |
| A4= | 3.15332310E−04 | −1.76789800E−03 | 2.14266830E−02 | 2.98230080E−02 |
| A6= | 1.31527550E−04 | 3.52630630E−04 | −9.98853960E−04 | 1.27051980E−04 |
| A8= | −2.07040270E−05 | −1.76723710E−04 | −1.11219740E−03 | −5.99271600E−04 |
| A10= | 1.60351540E−06 | 7.13034770E−05 | 4.37177560E−04 | −1.95310110E−04 |
| A12= | −7.31370560E−08 | −1.76861410E−05 | −7.99902590E−05 | 3.02849500E−04 |
| A14= | 2.00467550E−09 | 2.31614010E−06 | 7.66236140E−06 | −9.60081980E−05 |
| A16= | −2.89885150E−11 | −1.52366950E−07 | −3.05095490E−07 | 1.07843580E−05 |
| A18= | 3.76176210E−14 | 4.04798580E−09 | — | — |
| A20= | 5.93825890E−15 | — | — | — |
| A22= | −9.08128510E−17 | — | — | — |
| A24= | 4.55281980E−19 | — | — | — |

| Surface # | 6 | 7 | 8 | 9 |
|---|---|---|---|---|
| k= | 2.33371000E+01 | −7.06868000E−01 | −2.84365000E+01 | 7.21100000E+00 |
| A4= | 4.55524230E−03 | 1.33689700E−02 | 1.71710010E−02 | 5.66695570E−03 |
| A6= | 2.91784490E−03 | −7.79851740E−03 | −7.08179860E−03 | −1.60600040E−03 |
| A8= | −1.73092220E−02 | 1.12326160E−03 | 7.90791150E−04 | 1.14462120E−03 |
| A10= | 2.83223130E−02 | −1.92756420E−04 | 7.93695630E−04 | −7.54068570E−04 |
| A12= | −2.88226520E−02 | 7.81101010E−05 | −5.52346910E−04 | 3.37748480E−04 |
| A14= | 1.81217130E−02 | −1.12121650E−05 | 1.86447540E−04 | −8.44261360E−05 |
| A16= | −6.79123090E−03 | — | −3.19859320E−05 | 1.17268560E−05 |
| A18= | 1.38508060E−03 | — | 2.20809070E−06 | −6.67547010E−07 |
| A20= | −1.17757720E−04 | — | — | — |

| Surface # | 15 | 16 |
|---|---|---|
| k= | 1.52522000E+01 | −3.15891000E+01 |
| A4= | −2.46790240E−03 | 1.09349480E−02 |
| A6= | −7.24172030E−03 | −7.65914150E−03 |
| A8= | 4.12576740E−03 | 4.63478720E−03 |
| A10= | −3.15960320E−03 | −3.22130980E−03 |
| A12= | 1.49499620E−03 | 1.38917580E−03 |
| A14= | −4.44324470E−04 | −3.62666330E−04 |
| A16= | 8.61848470E−05 | 5.84629360E−05 |
| A18= | −9.75911620E−06 | −5.35546820E−06 |
| A20= | 4.73263730E−07 | 2.11077560E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.49 | f/f56 | −0.04 |
| FNO | 2.15 | f/R3 | −0.64 |
| HFOV [deg.] | 86.1 | N1 | 1.583 |
| (CT6 + CT7)/f | 0.46 | N2 | 1.543 |
| (R1 + R2)/(R1 − R2) | 0.92 | N3 | 1.607 |
| (R3 + R4)/(R3 − R4) | −2.27 | N4 | 1.534 |
| (R7 + R8)/(R7 − R8) | 0.37 | N5 | 1.706 |
| (R9 + R10)/(R9 − R10) | 0.03 | N6 | 1.946 |
| (R13 + R14)/(R13 − R14) | −1.07 | N7 | 1.614 |
| CT1/ΣCT | 0.14 | R10/R11 | 1.21 |
| CT7/f | 0.21 | SL/TL | 0.59 |
| f/f1 | −0.43 | T23/f | 0.84 |
| f/f2 | −0.20 | T23/T12 | 0.74 |
| f/f5 | 0.58 | |Dsr5/Dsr6| | 0.19 |
| f/f7 | 0.15 | — | — |

4th Embodiment

Figure 7:
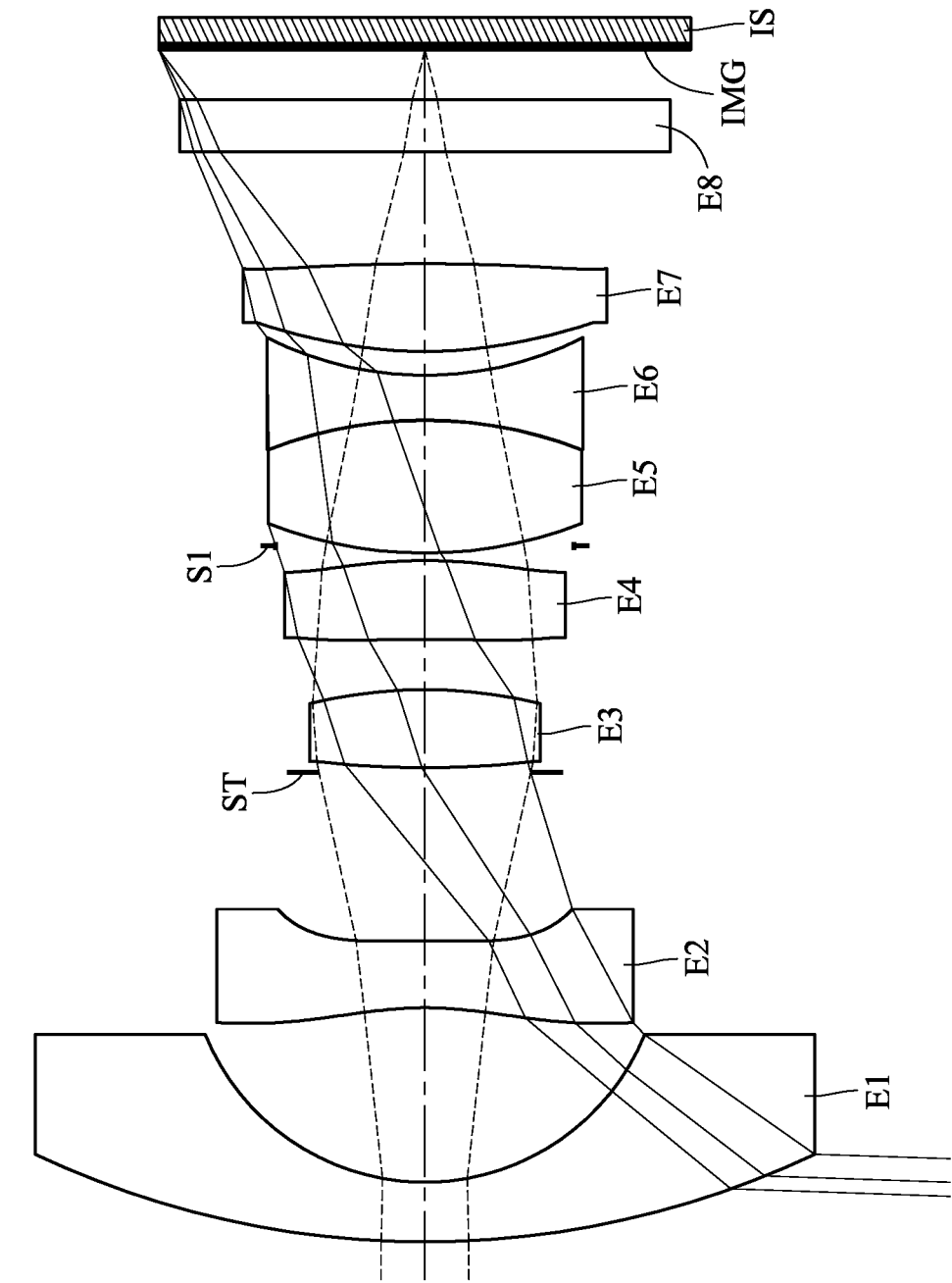
FIG. 7 is a schematic view of an image capturing unit according to the 4th embodiment of the present disclosure.
Figure 8:
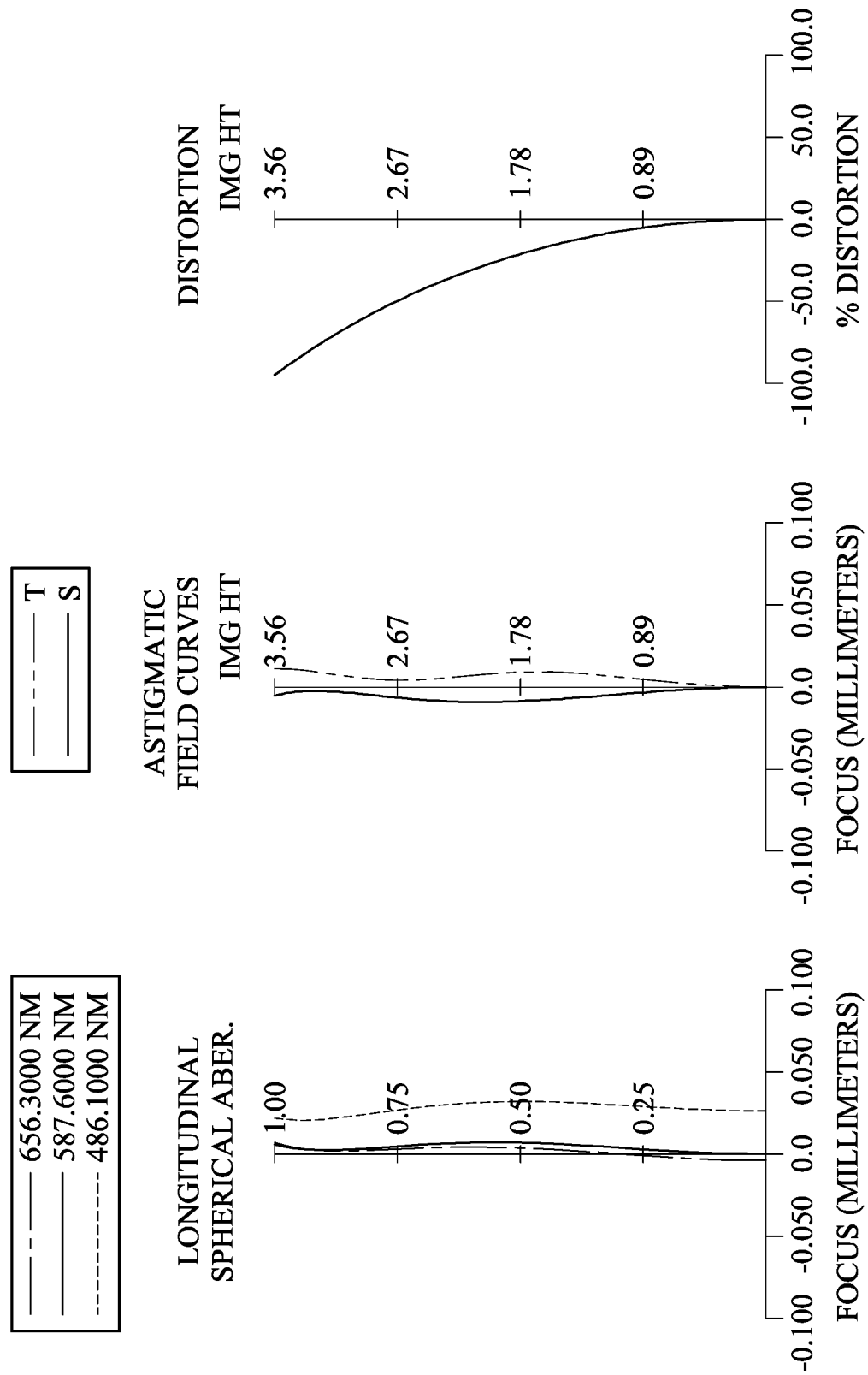
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The object-side surface of the second lens element E2 has one critical point in an off-axis region thereof. The image-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has one inflection point. The image-side surface of the fourth lens element E4 has one inflection point. The object-side surface of the fourth lens element E4 has one critical point in an off-axis region thereof. The image-side surface of the fourth lens element E4 has one critical point in an off-axis region thereof.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical. The object-side surface of the sixth lens element E6 is cemented to the image-side surface of the fifth lens element E5.

The seventh lens element E7 with positive refractive power has an object-side surface being convex in a paraxial region thereof and an image-side surface being convex in a paraxial region thereof. The seventh lens element E7 is made of plastic material and has the object-side surface and the image-side surface being both aspheric. The image-side surface of the seventh lens element E7 has one inflection point. The image-side surface of the seventh lens element E7 has one critical point in an off-axis region thereof.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 4th embodiment are shown in Table 7 and the aspheric surface data are shown in Table 8 below.

TABLE 7

4th Embodiment
f = 2.40 mm, FNO = 2.05, HFOV = 88.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.2070 | (SPH) | 0.800 | Glass | 1.804 | 46.6 | −5.57 |
| 2 | | 3.1813 | (SPH) | 2.340 | | | | |
| 3 | Lens 2 | −4.8365 | (ASP) | 0.894 | Plastic | 1.544 | 56.0 | −10.20 |
| 4 | | −40.2123 | (ASP) | 2.267 | | | | |
| 5 | Ape. Stop | Plano | | 0.059 | | | | |
| 6 | Lens 3 | 12.4841 | (SPH) | 1.050 | Glass | 1.788 | 47.4 | 5.50 |
| 7 | | −6.4001 | (SPH) | 0.674 | | | | |
| 8 | Lens 4 | −32.7203 | (ASP) | 1.058 | Plastic | 1.544 | 56.0 | 14.88 |
| 9 | | −6.5627 | (ASP) | 0.197 | | | | |
| 10 | Stop | Plano | | −0.097 | | | | |
| 11 | Lens 5 | 5.7679 | (SPH) | 1.780 | Glass | 1.804 | 46.6 | 3.85 |
| 12 | | −5.7679 | (SPH) | 0.005 | Cemented | 1.550 | 43.9 | — |
| 13 | Lens 6 | −5.7679 | (SPH) | 0.600 | Glass | 1.923 | 18.9 | −2.73 |
| 14 | | 4.6943 | (SPH) | 0.320 | | | | |
| 15 | Lens 7 | 5.8014 | (ASP) | 1.178 | Plastic | 1.544 | 56.0 | 9.01 |
| 16 | | −29.3593 | (ASP) | 1.500 | | | | |
| 17 | Filter | Plano | | 0.700 | Glass | 1.516 | 64.1 | — |

TABLE 7-continued

4th Embodiment
f = 2.40 mm, FNO = 2.05, HFOV = 88.1 deg.

| Surface # | Curvature Radius | Thickness | Material | Index | Abbe # | Focal Length |
|---|---|---|---|---|---|---|
| 18 | | Plano | 0.668 | | | |
| 19 | Image | Plano | — | | | |

Note:
Reference wavelength is 587.6 nm (d-line).
An effective radius of the stop S1 (Surface 10) is 2.000 mm.

TABLE 8

Aspheric Coefficients

| Surface # | 3 | 4 | 8 | 9 |
|---|---|---|---|---|
| k= | 6.46676000E−02 | −8.98925000E+01 | 0.00000000E+00 | 0.00000000E+00 |
| A4= | 2.05475000E−02 | 2.79969000E−02 | 5.43235000E−03 | 5.38514000E−03 |
| A6= | −2.00241000E−03 | −5.42495000E−04 | 1.06867000E−03 | 1.07361000E−03 |
| A8= | 1.68182000E−04 | 2.54382000E−04 | −5.46384000E−05 | 4.06073000E−05 |
| A10= | −1.00741000E−05 | 4.39808000E−06 | 5.40009000E−07 | −9.44602000E−07 |
| A12= | 2.90778000E−07 | 4.83841000E−06 | — | — |

| Surface # | 15 | 16 |
|---|---|---|
| k= | 6.65972000E−01 | −7.44391000E+01 |
| A4= | −5.50195000E−03 | −1.87932000E−03 |
| A6= | 6.25615000E−04 | 3.75433000E−04 |
| A8= | −5.17976000E−05 | −5.12606000E−06 |
| A10= | 6.30927000E−06 | 5.52829000E−06 |
| A12= | −5.23910000E−07 | −5.12958000E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.40 | f/f56 | −0.10 |
| FNO | 2.05 | f/R3 | −0.50 |
| HFOV [deg.] | 88.1 | N1 | 1.804 |
| (CT6 + CT7)/f | 0.74 | N2 | 1.544 |
| (R1 + R2)/(R1 − R2) | 1.70 | N3 | 1.788 |
| (R3 + R4)/(R3 − R4) | −1.27 | N4 | 1.544 |
| (R7 + R8)/(R7 − R8) | 1.50 | N5 | 1.804 |
| (R9 + R10)/(R9 − R10) | 0.00 | N6 | 1.923 |
| (R13 + R14)/(R13 − R14) | −0.67 | N7 | 1.544 |
| CT1/ΣCT | 0.11 | R10/R11 | 1.00 |
| CT7/f | 0.49 | SL/TL | 0.61 |
| f/f1 | −0.43 | T23/f | 0.97 |
| f/f2 | −0.24 | T23/T12 | 0.99 |
| f/f5 | 0.62 | |Dsr5/Dsr6| | 0.05 |
| f/f7 | 0.27 | — | — |

5th Embodiment

Figure 9:
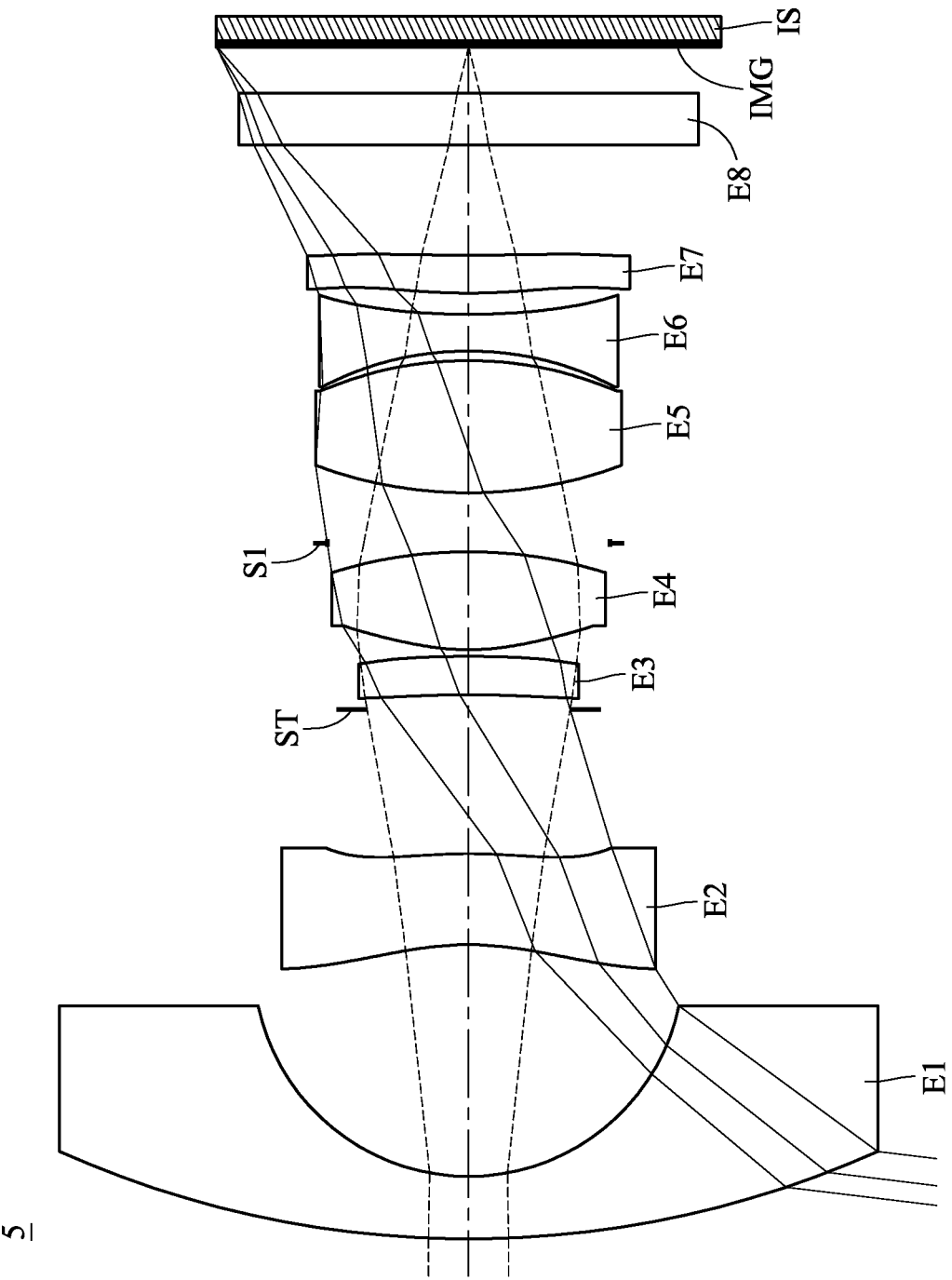
FIG. 9 is a schematic view of an image capturing unit according to the 5th embodiment of the present disclosure.
Figure 10:
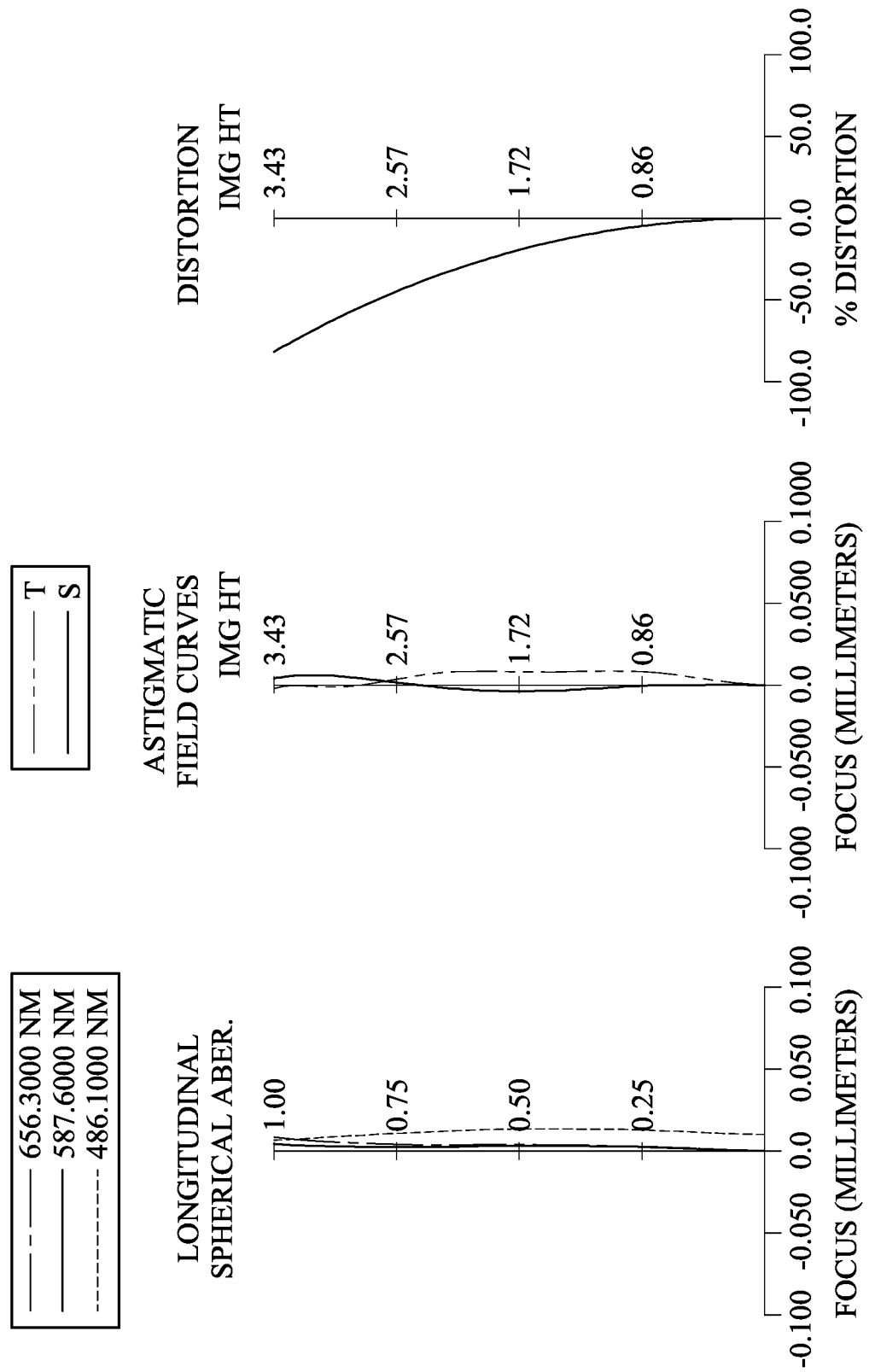
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit 5 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with negative refractive power has an object-side surface being concave in a paraxial region thereof and an image-side surface being convex in a paraxial region thereof. The third lens element E3 is made of plastic material and has the object-side surface and the image-side surface being both aspheric. The object-side surface of the third lens element E3 has three inflection points.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has one inflection point. The image-side surface of the fifth lens element E5 has one inflection point.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both aspheric. The object-side surface of the sixth lens element E6 has one inflection point.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has two inflection points. The image-side surface of the seventh lens element E7 has two inflection points. The object-side surface of the seventh lens element E7 has one critical point in an off-axis region thereof. The image-side surface of the seventh lens element E7 has two critical points in an off-axis region thereof.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 5th embodiment are shown in Table 9 and the aspheric surface data are shown in Table 10 below.

TABLE 9

5th Embodiment
f = 2.26 mm, FNO = 2.08, HFOV = 83.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 13.5974 | (SPH) | 0.849 | Glass | 1.734 | 51.5 | −5.25 |
| 2 | | 2.9222 | (SPH) | 3.151 | | | | |
| 3 | Lens 2 | −4.0484 | (ASP) | 1.237 | Plastic | 1.534 | 55.9 | −18.65 |
| 4 | | −7.5496 | (ASP) | 1.966 | | | | |
| 5 | Ape. Stop | Plano | | 0.201 | | | | |
| 6 | Lens 3 | −9.8962 | (ASP) | 0.520 | Plastic | 1.540 | 59.7 | −64.20 |
| 7 | | −14.1059 | (ASP) | 0.090 | | | | |
| 8 | Lens 4 | 3.3622 | (ASP) | 1.330 | Plastic | 1.534 | 55.9 | 4.34 |
| 9 | | −6.4398 | (ASP) | 0.121 | | | | |
| 10 | Stop | Plano | | 0.682 | | | | |
| 11 | Lens 5 | 5.9474 | (ASP) | 1.797 | Plastic | 1.729 | 54.7 | 4.05 |
| 12 | | −5.1198 | (ASP) | 0.130 | | | | |
| 13 | Lens 6 | −4.3007 | (ASP) | 0.500 | Glass | 1.946 | 17.9 | −3.10 |
| 14 | | 9.7101 | (ASP) | 0.288 | | | | |
| 15 | Lens 7 | 9.1562 | (ASP) | 0.518 | Plastic | 1.566 | 37.4 | 17.29 |
| 16 | | 139.6168 | (ASP) | 1.500 | | | | |
| 17 | Filter | Plano | | 0.700 | Glass | 1.516 | 64.1 | — |
| 18 | | Plano | | 0.625 | | | | |
| 19 | Image | Plano | | — | | | | |

Note:
Reference wavelength is 587.6 nm (d-line).
An effective radius of the stop S1 (Surface 10) is 1.920 mm.

TABLE 10

Aspheric Coefficients

| Surface # | 3 | 4 | 6 | 7 |
|---|---|---|---|---|
| k= | −5.84148900E−01 | 6.41776600E+00 | −5.93193400E+00 | 2.22033100E+01 |
| A4= | 1.86569085E−02 | 2.66831517E−02 | 3.03955864E−02 | 7.35720265E−03 |
| A6= | −1.55654831E−03 | −2.25800847E−03 | −1.72095324E−02 | −1.88566640E−02 |
| A8= | 1.02079534E−04 | 2.73850756E−03 | 5.89037817E−03 | 1.07038044E−02 |
| A10= | 5.30015578E−06 | −2.62519613E−03 | 4.06820871E−05 | −7.93164781E−04 |
| A12= | −3.78857038E−06 | 1.69322259E−03 | −2.07443638E−03 | −3.18715142E−03 |
| A14= | 7.48974743E−07 | −6.82019036E−04 | 1.69177283E−03 | 2.47908061E−03 |
| A16= | −8.35944006E−08 | 1.66603188E−04 | −6.56282965E−04 | −8.78982359E−04 |
| A18= | 5.10060720E−09 | −2.25971560E−05 | 1.22595803E−04 | 1.53709565E−04 |
| A20= | −1.20097129E−10 | 1.31006012E−06 | −8.32781987E−06 | −1.04975419E−05 |

TABLE 10-continued

Aspheric Coefficients

| Surface # | 8 | 9 | 11 | 12 |
|---|---|---|---|---|
| k= | −1.74017400E+01 | 6.73284800E+00 | −8.02817600E−02 | 6.14110000E−02 |
| A4= | 3.69173351E−02 | 2.60987349E−03 | −4.06484676E−04 | −1.74661174E−03 |
| A6= | −4.24222279E−02 | 5.69747785E−04 | 3.49767146E−04 | 1.33343386E−02 |
| A8= | 3.43703655E−02 | −1.37551764E−03 | −7.13121837E−04 | −1.84142213E−02 |
| A10= | −2.02133162E−02 | 1.26287878E−03 | 4.43815741E−04 | 1.13035534E−02 |
| A12= | 8.50988065E−03 | −6.47036530E−04 | −1.11636149E−04 | −3.83734245E−03 |
| A14= | −2.42323136E−03 | 2.38287252E−04 | 6.69397602E−06 | 7.42057150E−04 |
| A16= | 4.38458674E−04 | −5.70101569E−05 | 3.24529399E−06 | −6.78697401E−05 |
| A18= | −4.54338502E−05 | 7.68911185E−06 | −8.00700431E−07 | −2.98887362E−07 |
| A20= | 2.04890846E−06 | −4.47087700E−07 | 5.46670112E−08 | 3.81156160E−07 |

| Surface # | 13 | 14 | 15 | 16 |
|---|---|---|---|---|
| k= | 1.91578400E−02 | 8.15340700E+00 | 1.50329300E+01 | −9.00000000E+01 |
| A4= | −4.60318343E−03 | 9.11828753E−04 | 7.23969289E−03 | 1.38179497E−02 |
| A6= | 1.75449907E−02 | −5.05429525E−03 | −2.82789933E−02 | −1.38598720E−02 |
| A8= | −2.17931541E−02 | 6.51057112E−03 | 2.03667333E−02 | 6.71736803E−03 |
| A10= | 1.42574006E−02 | −3.59625367E−03 | −9.89452197E−03 | −2.38128183E−03 |
| A12= | −5.79761085E−03 | 1.09102028E−03 | 3.43311238E−03 | 6.42007568E−04 |
| A14= | 1.54496672E−03 | −1.86543415E−04 | −8.72786168E−04 | −1.33030806E−04 |
| A16= | −2.62949797E−04 | 1.64546654E−05 | 1.54773608E−04 | 2.01802333E−05 |
| A18= | 2.55264567E−05 | −6.06435814E−07 | −1.65807278E−05 | −1.86992822E−06 |
| A20= | −1.04291646E−06 | 1.04216332E−08 | 7.80556738E−07 | 7.47881862E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.26 | f/f56 | −0.04 |
| FNO | 2.08 | f/R3 | −0.56 |
| HFOV [deg.] | 83.1 | N1 | 1.734 |
| (CT6 + CT7)/f | 0.45 | N2 | 1.534 |
| (R1 + R2)/(R1 − R2) | 1.55 | N3 | 1.540 |
| (R3 + R4)/(R3 − R4) | −3.31 | N4 | 1.534 |
| (R7 + R8)/(R7 − R8) | −0.31 | N5 | 1.729 |
| (R9 + R10)/(R9 − R10) | 0.07 | N6 | 1.946 |
| (R13 + R14)/(R13 − R14) | −1.14 | N7 | 1.566 |
| CT1/ΣCT | 0.13 | R10/R11 | 1.19 |
| CT7/f | 0.23 | SL/TL | 0.56 |
| f/f1 | −0.43 | T23/f | 0.96 |
| f/f2 | −0.12 | T23/T12 | 0.69 |
| f/f5 | 0.56 | |Dsr5/Dsr6| | 0.28 |
| f/f7 | 0.13 | — | — |

6th Embodiment

Figure 11:
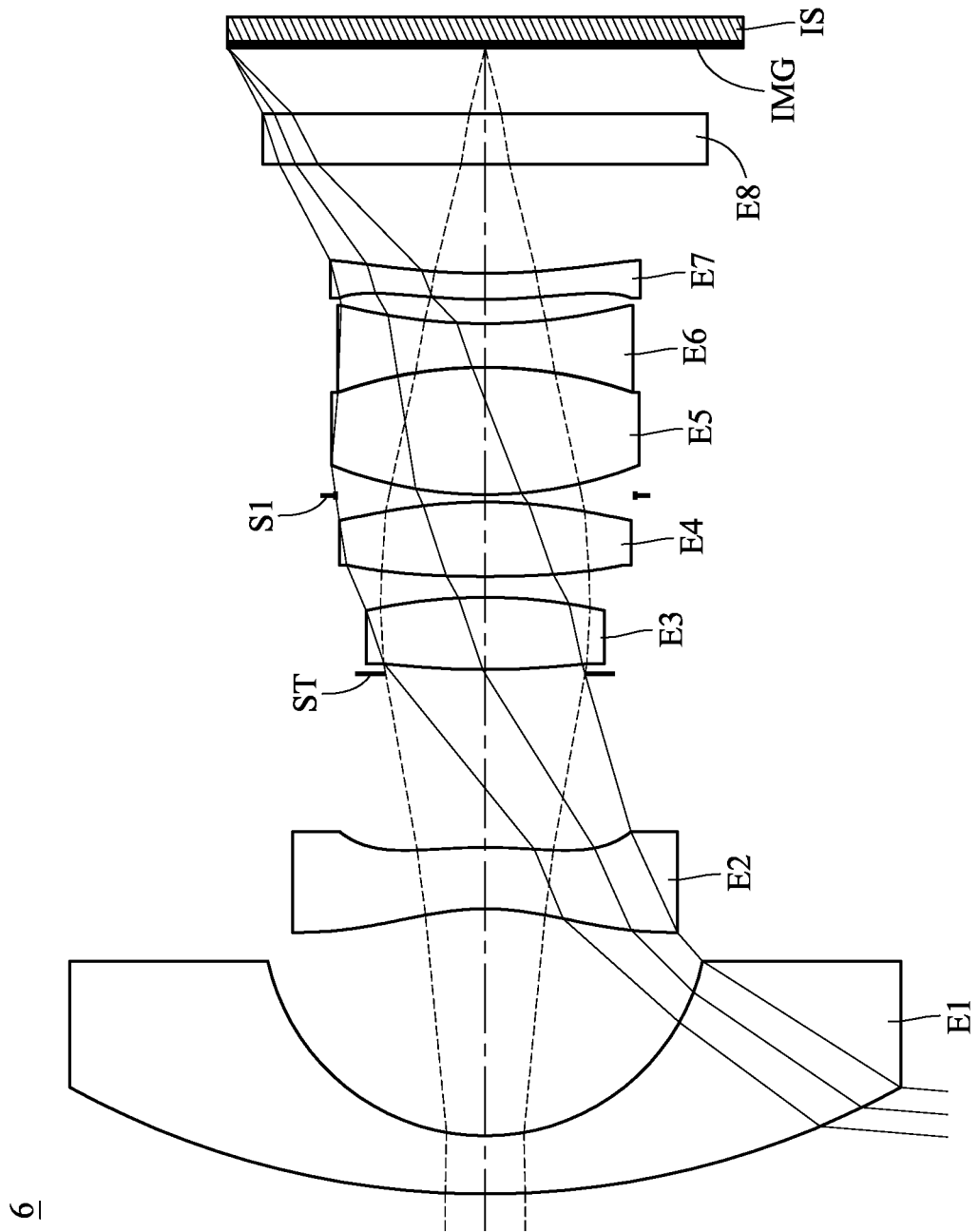
FIG. 11 is a schematic view of an image capturing unit according to the 6th embodiment of the present disclosure.
Figure 12:
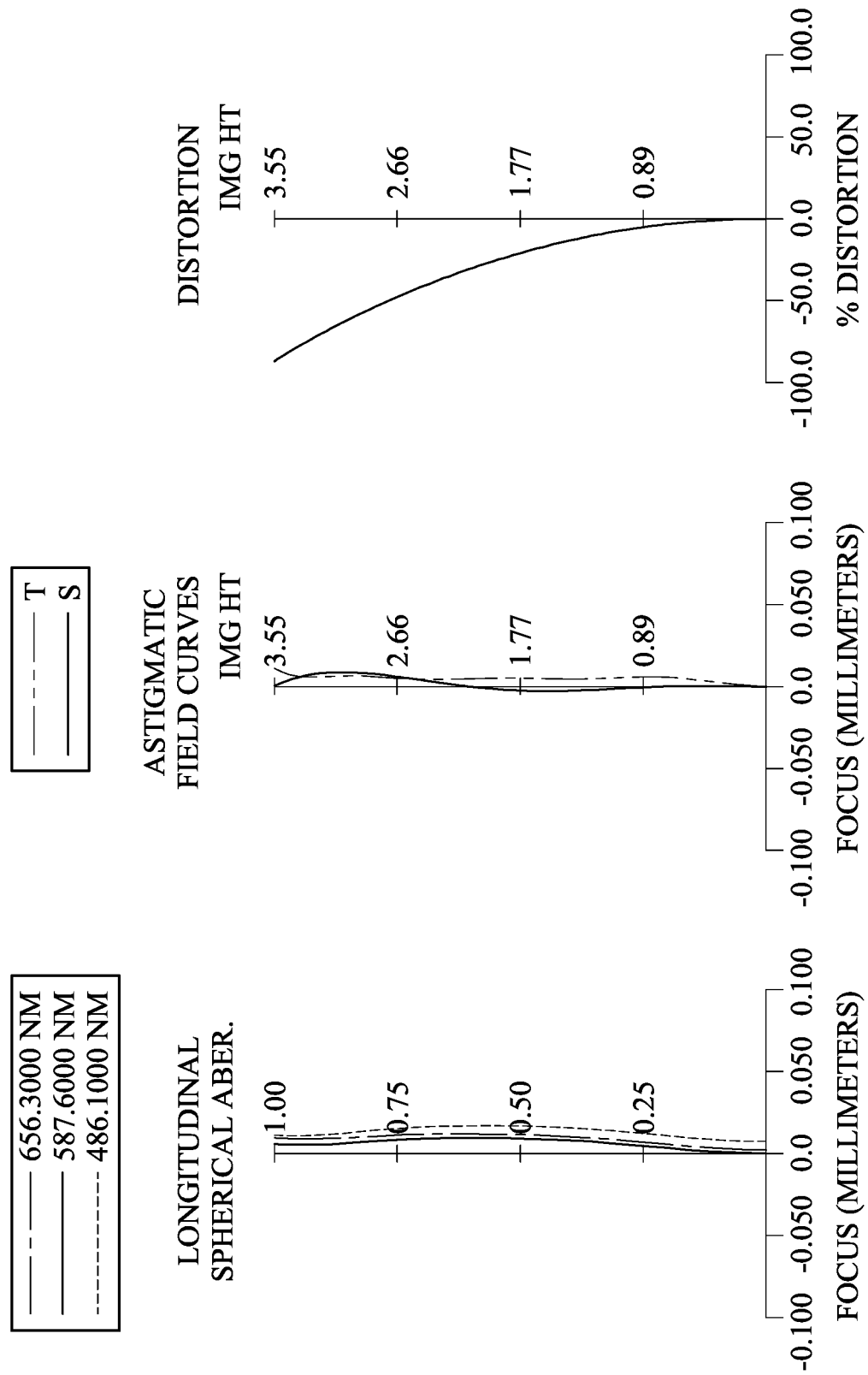
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit 6 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has one inflection point. The image-side surface of the second lens element E2 has one inflection point. The image-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical. The object-side surface of the sixth lens element E6 is cemented to the image-side surface of the fifth lens element E5.

The seventh lens element E7 with positive refractive power has an object-side surface being convex in a paraxial region thereof and an image-side surface being concave in a paraxial region thereof. The seventh lens element E7 is made of plastic material and has the object-side surface and the image-side surface being both aspheric. The object-side surface of the seventh lens element E7 has one inflection point. The image-side surface of the seventh lens element E7 has one inflection point. The object-side surface of the seventh lens element E7 has one critical point in an off-axis region thereof.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 6th embodiment are shown in Table 11 and the aspheric surface data are shown in Table 12 below.

TABLE 11

6th Embodiment
f = 2.30 mm, FNO = 2.09, HFOV = 85.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.8668 | (SPH) | 0.800 | Glass | 1.734 | 51.5 | −5.85 |
| 2 | | 3.0643 | (SPH) | 3.130 | | | | |
| 3 | Lens 2 | −3.5445 | (ASP) | 0.848 | Plastic | 1.544 | 56.0 | −13.79 |
| 4 | | −7.2863 | (ASP) | 2.393 | | | | |
| 5 | Ape. Stop | Plano | | 0.058 | | | | |
| 6 | Lens 3 | 12.0077 | (SPH) | 0.996 | Glass | 1.667 | 48.3 | 7.05 |
| 7 | | −7.4624 | (SPH) | 0.289 | | | | |
| 8 | Lens 4 | 16.9052 | (ASP) | 1.026 | Plastic | 1.534 | 56.0 | 9.34 |
| 9 | | −6.9328 | (ASP) | 0.090 | | | | |
| 10 | Stop | Plano | | 0.010 | | | | |
| 11 | Lens 5 | 5.7285 | (SPH) | 1.756 | Glass | 1.734 | 51.5 | 4.29 |
| 12 | | −6.0912 | (SPH) | 0.005 | Cemented | 1.550 | 43.9 | — |
| 13 | Lens 6 | −6.0912 | (SPH) | 0.600 | Glass | 1.946 | 17.9 | −3.60 |
| 14 | | 8.0603 | (SPH) | 0.332 | | | | |
| 15 | Lens 7 | 7.5717 | (ASP) | 0.360 | Plastic | 1.686 | 18.4 | 54.52 |
| 16 | | 9.3098 | (ASP) | 1.500 | | | | |
| 17 | Filter | Plano | | 0.700 | Glass | 1.516 | 64.1 | — |
| 18 | | Plano | | 0.900 | | | | |
| 19 | Image | Plano | | — | | | | |

Note:
Reference wavelength is 587.6 nm (d-line).
An effective radius of the stop S1 (Surface 10) is 2.060 mm.

TABLE 12

Aspheric Coefficients

| Surface # | 3 | 4 | 8 | 9 |
|---|---|---|---|---|
| k= | −1.21028500E+00 | −1.91514500E+01 | −9.00000000E+01 | 8.30207400E+00 |
| A4= | 2.23057104E−02 | 2.21585544E−02 | 4.80581698E−03 | 3.95241212E−02 |
| A6= | −1.33769190E−03 | 1.44967705E−03 | 1.00619875E−03 | 6.76211766E−04 |
| A8= | −2.40355876E−04 | −4.56105844E−04 | −1.31774319E−03 | 3.12024125E−04 |
| A10= | 8.96858840E−05 | 2.59091923E−05 | 1.09957179E−03 | −2.15531727E−04 |
| A12= | −1.33132343E−05 | 5.63203564E−05 | −5.42490394E−04 | 9.89131464E−05 |
| A14= | 9.65291957E−07 | −1.47048387E−05 | 1.55200735E−04 | −2.57014122E−05 |
| A16= | −2.78815178E−08 | 1.24884935E−06 | −2.36958169E−05 | 3.69541750E−06 |
| A18= | — | — | 1.47854241E−06 | −2.13939542E−07 |

| Surface # | 15 | 16 |
|---|---|---|
| k= | −3.25631200E+00 | −2.49664300E+00 |
| A4= | −1.23206956E−02 | −2.83276140E−03 |
| A6= | 1.27874773E−03 | −1.28892124E−03 |
| A8= | −1.54740862E−03 | 2.24319707E−03 |
| A10= | 1.32103714E−03 | −1.79946956E−03 |
| A12= | −8.84802508E−04 | 8.66760085E−04 |
| A14= | 3.91767227E−04 | −2.56811732E−04 |
| A16= | −1.07243757E−04 | 4.51266939E−05 |
| A18= | 1.61699274E−05 | −4.29513850E−06 |
| A20= | −1.02968134E−06 | 1.68872161E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.30 | f/f56 | 0.00 |
| FNO | 2.09 | f/R3 | −0.65 |
| HFOV [deg.] | 85.1 | N1 | 1.734 |
| (CT6 + CT7)/f | 0.42 | N2 | 1.544 |
| (R1 + R2)/(R1 − R2) | 1.70 | N3 | 1.667 |
| (R3 + R4)/(R3 − R4) | −2.89 | N4 | 1.534 |
| (R7 + R8)/(R7 − R8) | 0.42 | N5 | 1.734 |
| (R9 + R10)/(R9 − R10) | −0.03 | N6 | 1.946 |
| (R13 + R14)/(R13 − R14) | −9.71 | N7 | 1.686 |
| CT1/ΣCT | 0.13 | R10/R11 | 1.00 |
| CT7/f | 0.16 | SL/TL | 0.55 |
| f/f1 | −0.39 | T23/f | 1.07 |
| f/f2 | −0.17 | T23/T12 | 0.78 |
| f/f5 | 0.54 | |Dsr5/Dsr6| | 0.05 |
| f/f7 | 0.04 | — | — |

7th Embodiment

Figure 13:
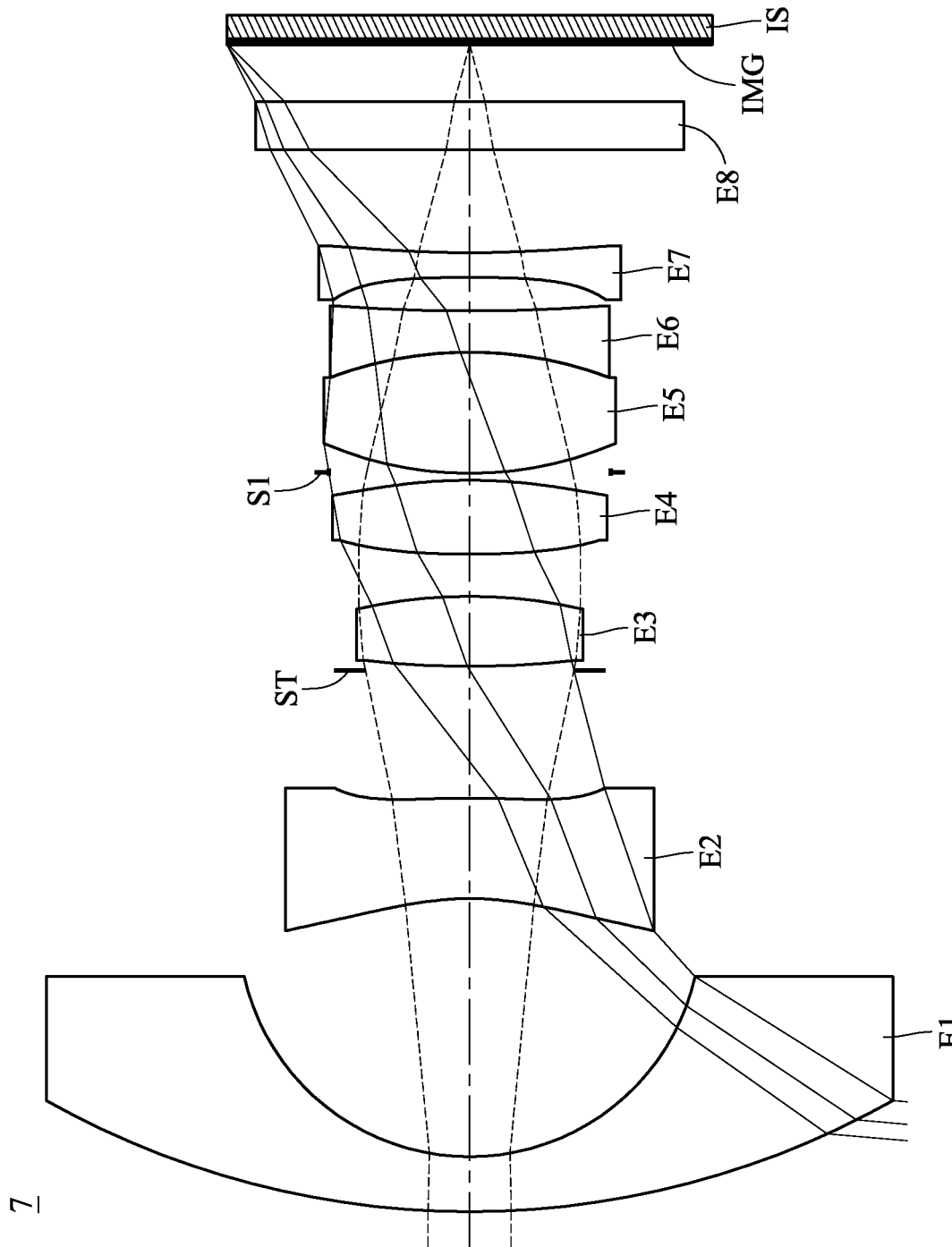
FIG. 13 is a schematic view of an image capturing unit according to the 7th embodiment of the present disclosure.
Figure 14:
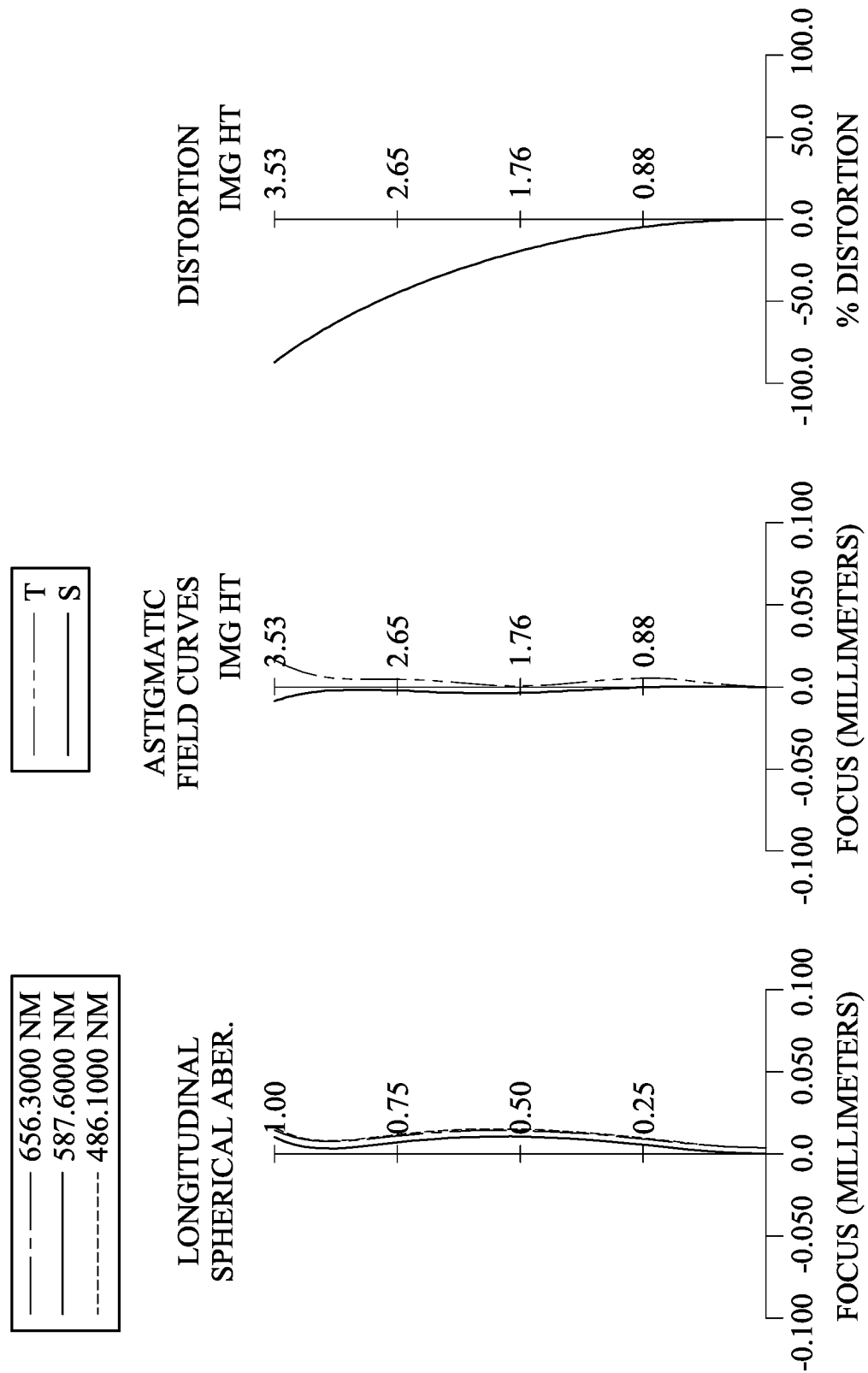
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit 7 includes the imaging optical lens system (its reference numeral is omitted) of the present disclosure and an image sensor IS. The imaging optical lens system includes, in order from an object side to an image side along an optical axis, a first lens element E1, a second lens element E2, an aperture stop ST, a third lens element E3, a fourth lens element E4, a stop S1, a fifth lens element E5, a sixth lens element E6, a seventh lens element E7, a filter E8 and an image surface IMG. The imaging optical lens system includes seven lens elements (E1, E2, E3, E4, E5, E6 and E7) with no additional lens element disposed between each of the adjacent seven lens elements.

The first lens element E1 with negative refractive power has an object-side surface being convex in a paraxial region thereof and an image-side surface being concave in a paraxial region thereof. The first lens element E1 is made of glass material and has the object-side surface and the image-side surface being both spherical.

The second lens element E2 with negative refractive power has an object-side surface being concave in a paraxial region thereof and an image-side surface being convex in a paraxial region thereof. The second lens element E2 is made of plastic material and has the object-side surface and the image-side surface being both aspheric. The object-side surface of the second lens element E2 has two inflection points. The image-side surface of the second lens element E2 has one inflection point. The image-side surface of the second lens element E2 has one critical point in an off-axis region thereof.

The third lens element E3 with positive refractive power has an object-side surface being convex in a paraxial region thereof and an image-side surface being convex in a paraxial region thereof. The third lens element E3 is made of glass material and has the object-side surface and the image-side surface being both spherical.

The fourth lens element E4 with positive refractive power has an object-side surface being convex in a paraxial region thereof and an image-side surface being convex in a paraxial region thereof. The fourth lens element E4 is made of plastic material and has the object-side surface and the image-side surface being both aspheric.

The fifth lens element E5 with positive refractive power has an object-side surface being convex in a paraxial region thereof and an image-side surface being convex in a paraxial region thereof. The fifth lens element E5 is made of glass material and has the object-side surface and the image-side surface being both spherical.

The sixth lens element E6 with negative refractive power has an object-side surface being concave in a paraxial region thereof and an image-side surface being concave in a paraxial region thereof. The sixth lens element E6 is made of glass material and has the object-side surface and the image-side surface being both spherical. The object-side surface of the sixth lens element E6 is cemented to the image-side surface of the fifth lens element E5.

The seventh lens element E7 with negative refractive power has an object-side surface being concave in a paraxial region thereof and an image-side surface being concave in a paraxial region thereof. The seventh lens element E7 is made of plastic material and has the object-side surface and the image-side surface being both aspheric. The image-side surface of the seventh lens element E7 has one inflection point.

The filter E8 is made of glass material and located between the seventh lens element E7 and the image surface IMG, and will not affect the focal length of the imaging optical lens system. The image sensor IS is disposed on or near the image surface IMG of the imaging optical lens system.

The detailed optical data of the 7th embodiment are shown in Table 13 and the aspheric surface data are shown in Table 14 below.

TABLE 13

7th Embodiment
f = 2.33 mm, FNO = 1.93, HFOV = 85.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.5150 | (SPH) | 0.800 | Glass | 1.734 | 51.5 | −6.50 |
| 2 | | 3.3608 | (SPH) | 3.759 | | | | |
| 3 | Lens 2 | −4.3171 | (ASP) | 1.466 | Plastic | 1.544 | 56.0 | −12.83 |
| 4 | | −12.6758 | (ASP) | 1.861 | | | | |
| 5 | Ape. Stop | Plano | | 0.056 | | | | |

TABLE 13-continued

7th Embodiment
f = 2.33 mm, FNO = 1.93, HFOV = 85.1 deg.

| Surface # | | Curvature Radius | | Thickness | Material | Index | Abbe # | Focal Length |
|---|---|---|---|---|---|---|---|---|
| 6 | Lens 3 | 13.3969 | (SPH) | 1.021 | Glass | 1.589 | 61.1 | 8.20 |
| 7 | | −7.3443 | (SPH) | 0.615 | | | | |
| 8 | Lens 4 | 14.3929 | (ASP) | 1.076 | Plastic | 1.534 | 56.0 | 9.39 |
| 9 | | −7.5051 | (ASP) | 0.119 | | | | |
| 10 | Stop | Plano | | −0.019 | | | | |
| 11 | Lens 5 | 5.3638 | (SPH) | 1.762 | Glass | 1.734 | 51.5 | 4.06 |
| 12 | | −5.7679 | (SPH) | 0.005 | Cemented | 1.550 | 43.9 | — |
| 13 | Lens 6 | −5.7679 | (SPH) | 0.600 | Glass | 1.922 | 20.9 | −5.13 |
| 14 | | 27.6149 | (SPH) | 0.487 | | | | |
| 15 | Lens 7 | −28.9213 | (ASP) | 0.360 | Plastic | 1.686 | 18.4 | −14.34 |
| 16 | | 14.9801 | (ASP) | 1.500 | | | | |
| 17 | Filter | Plano | | 0.700 | Glass | 1.516 | 64.1 | — |
| 18 | | Plano | | 0.827 | | | | |
| 19 | Image | Plano | | — | | | | |

Note:
Reference wavelength is 587.6 nm (d-line).
An effective radius of the stop S1 (Surface 10) is 2.050 mm.

TABLE 14

Aspheric Coefficients

| Surface # | 3 | 4 | 8 | 9 |
|---|---|---|---|---|
| k= | 1.11332000E−01 | 3.30833000E+01 | −5.37767000E+01 | 9.02818000E+00 |
| A4= | 1.35412420E−02 | 2.05168520E−02 | 7.17033930E−03 | 4.32529120E−03 |
| A6= | −6.05906960E−04 | 2.14158220E−04 | 9.86580870E−04 | 9.58826260E−04 |
| A8= | −7.24866150E−05 | 4.01211070E−04 | −1.18357130E−03 | −3.60624200E−04 |
| A10= | 2.49489290E−05 | −4.15413380E−04 | 8.99501640E−04 | 3.15336500E−04 |
| A12= | −3.25659410E−06 | 2.21845760E−04 | −4.10713110E−04 | −1.55388570E−04 |
| A14= | 1.94491770E−07 | −5.14488090E−05 | 1.09589560E−04 | 4.47000110E−05 |
| A16= | −3.70744810E−09 | 4.65295130E−06 | −1.58175030E−05 | −6.82895560E−06 |
| A18= | — | — | 9.49407350E−07 | 4.33230050E−07 |

| Surface # | 15 | 16 |
|---|---|---|
| k= | 9.00000000E+01 | 7.03796000E−01 |
| A4= | −1.92215460E−02 | −8.64153830E−03 |
| A6= | 7.65706360E−03 | 6.72847810E−03 |
| A8= | −7.08159530E−03 | −5.23503460E−03 |
| A10= | 4.62393100E−03 | 3.27437370E−03 |
| A12= | −1.98836660E−03 | −1.37488730E−03 |
| A14= | 5.26789440E−04 | 3.64966470E−04 |
| A16= | −8.25014820E−05 | −5.92182450E−05 |
| A18= | 6.80851970E−06 | 5.37043760E−06 |
| A20= | −2.19947320E−07 | −2.08716950E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.33 | f/f56 | 0.19 |
| FNO | 1.93 | f/R3 | −0.54 |
| HFOV [deg.] | 85.1 | N1 | 1.734 |
| (CT6 + CT7)/f | 0.41 | N2 | 1.544 |
| (R1 + R2)/(R1 − R2) | 1.73 | N3 | 1.589 |

-continued

| 7th Embodiment | | | |
|---|---|---|---|
| (R3 + R4)/(R3 − R4) | −2.03 | N4 | 1.534 |
| (R7 + R8)/(R7 − R8) | 0.31 | N5 | 1.734 |
| (R9 + R10)/(R9 − R10) | −0.04 | N6 | 1.922 |
| (R13 + R14)/(R13 − R14) | 0.32 | N7 | 1.686 |
| CT1/ΣCT | 0.11 | R10/R11 | 1.00 |
| CT7/f | 0.15 | SL/TL | 0.54 |
| f/f1 | −0.36 | T23/f | 0.82 |
| f/f2 | −0.18 | T23/T12 | 0.51 |
| f/f5 | 0.57 | |Dsr5/Dsr6| | 0.05 |
| f/f7 | −0.16 | — | — |

8th Embodiment

Figure 15:
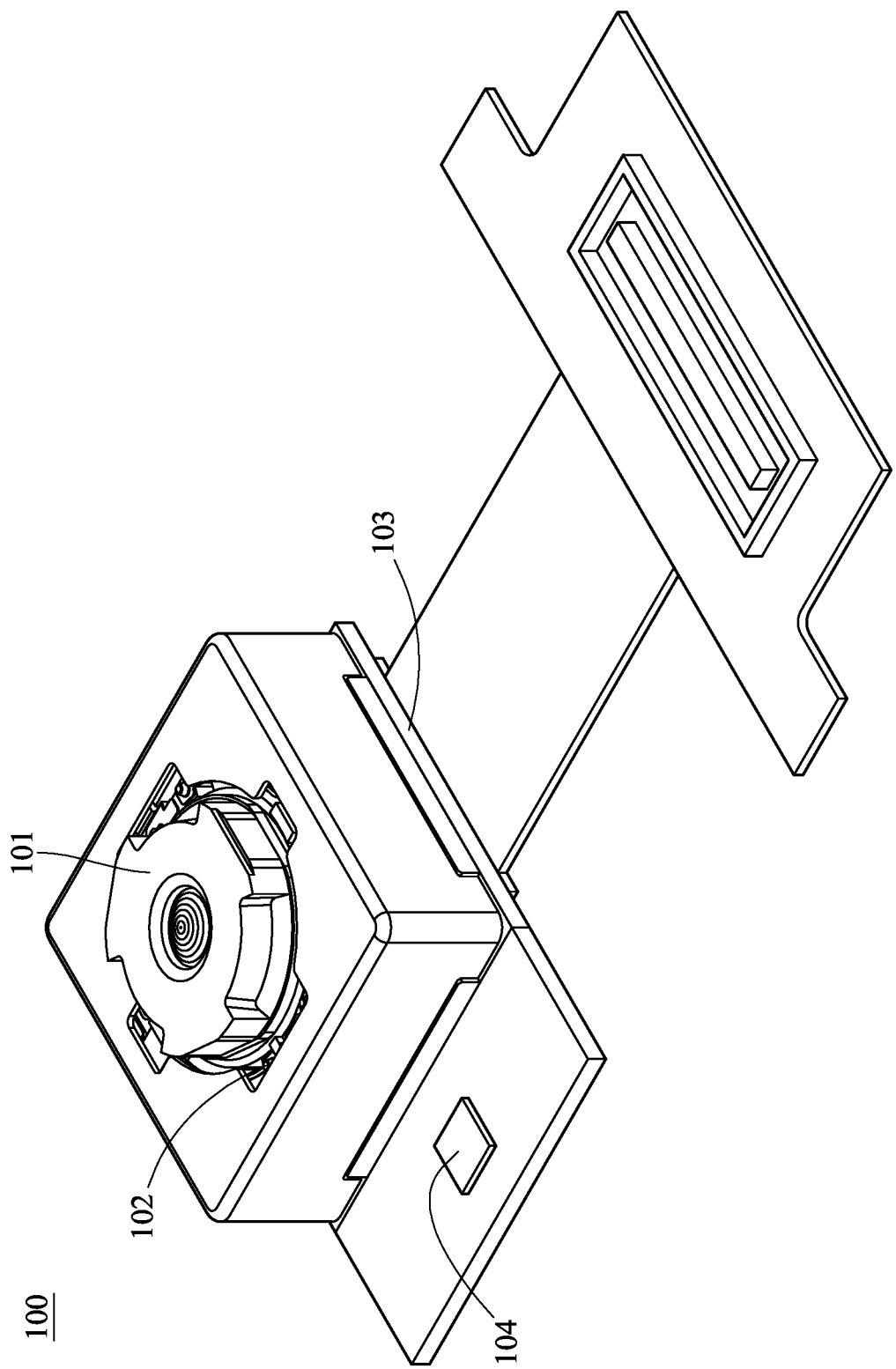
FIG. 15 is a perspective view of an image capturing unit according to the 8th embodiment of the present disclosure.

FIG. 15 is a perspective view of an image capturing unit according to the 8th embodiment of the present disclosure.

In this embodiment, an image capturing unit 100 is a camera module including a lens unit 101, a driving device 102, an image sensor 103 and an image stabilizer 104. The lens unit 101 includes the imaging optical lens system disclosed in the 1st embodiment, a barrel and a holder member (their reference numerals are omitted) for holding the imaging optical lens system. However, the lens unit 101 may alternatively be provided with the imaging optical lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, shape memory alloy materials, or liquid lens systems. The driving device 102 is favorable for obtaining a better imaging position of the lens unit 101, so that a clear image of the imaged object can be captured by the lens unit 101 with different object distances or at different ambient temperatures. The image sensor 103 (for example, CCD or CMOS), which can feature high photosensitivity and low noise, is disposed on the image surface of the imaging optical lens system to provide higher image quality.

The image stabilizer 104, such as an accelerometer, a gyro sensor and a Hall effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

9th Embodiment

Figure 16:
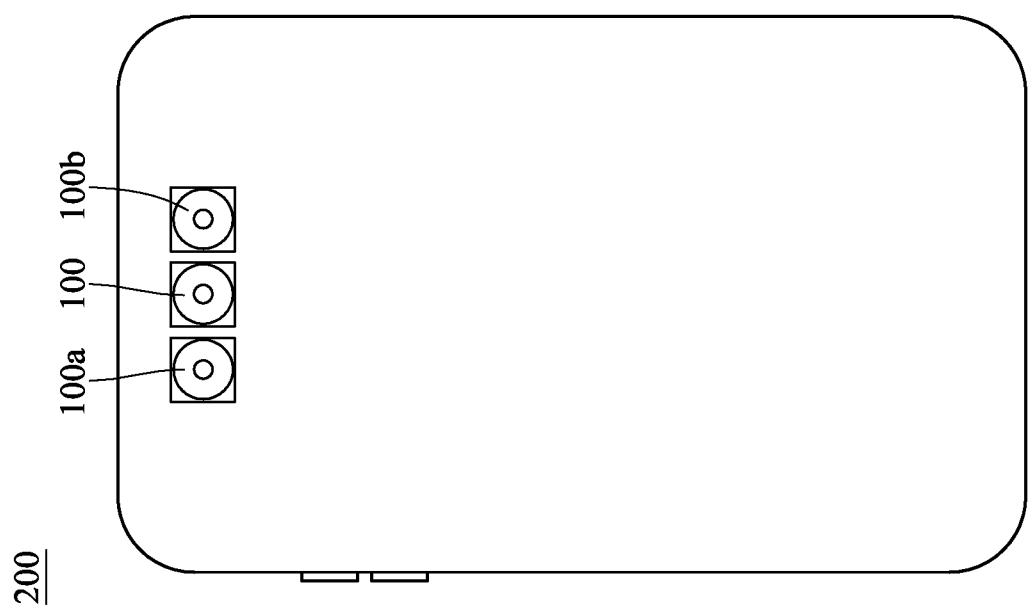
FIG. 16 is one perspective view of an electronic device according to the 9th embodiment of the present disclosure.
Figure 17:
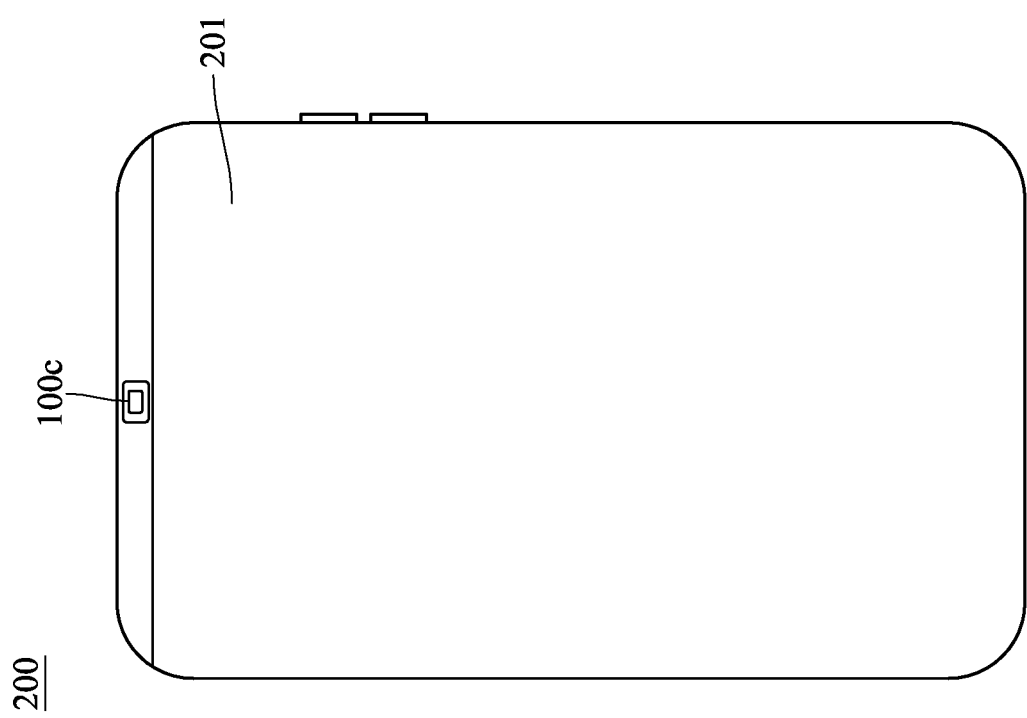
FIG. 17 is another perspective view of the electronic device in FIG. 16.

FIG. 16 is one perspective view of an electronic device according to the 9th embodiment of the present disclosure. FIG. 17 is another perspective view of the electronic device in FIG. 16.

In this embodiment, an electronic device 200 is a smartphone including the image capturing unit 100 disclosed in the 8th embodiment, an image capturing unit 100a, an image capturing unit 100b, an image capturing unit 100c and a display unit 201. As shown in FIG. 16, the image capturing unit 100, the image capturing unit 100a and the image capturing unit 100b are disposed on the same side of the electronic device 200 and face the same side, and each of the image capturing units 100, 100a and 100b has a single focal point. As shown in FIG. 17, the image capturing unit 100c and the display unit 201 are disposed on the opposite side of the electronic device 200, such that the image capturing unit 100c can be a front-facing camera of the electronic device 200 for taking selfies, but the present disclosure is not limited thereto. Furthermore, each of the image capturing units 100a, 100b and 100c can include the imaging optical lens system of the present disclosure and can have a configuration similar to that of the image capturing unit 100. In detail, each of the image capturing units 100a, 100b and 100c can include a lens unit, a driving device, an image sensor and an image stabilizer, and each of the lens unit can include an imaging optical lens system such as the imaging optical lens system of the present disclosure, a barrel and a holder member for holding the imaging optical lens system.

The image capturing unit 100 is a wide-angle image capturing unit, the image capturing unit 100a is a telephoto image capturing unit, the image capturing unit 100b is an ultra-wide-angle image capturing unit, and the image capturing unit 100c is a wide-angle image capturing unit. In this embodiment, the image capturing units 100, 100a and 100b have different fields of view, such that the electronic device 200 can have various magnification ratios so as to meet the requirement of optical zoom functionality. Moreover, as shown in FIG. 17, the image capturing unit 100c can have a non-circular opening, and the optical elements in the image capturing unit 100c can have one or more trimmed edges at outer diameter positions thereof for corresponding to the non-circular opening. Therefore, it is favorable for further reducing the size of the image capturing unit 100c, thereby increasing the area ratio of the display unit 201 with respect to the electronic device 200 and reducing the thickness of the electronic device 200. In this embodiment, the electronic device 200 includes multiple image capturing units 100, 100a, 100b and 100c, but the present disclosure is not limited to the number and arrangement of image capturing units.

10th Embodiment

Figure 18:
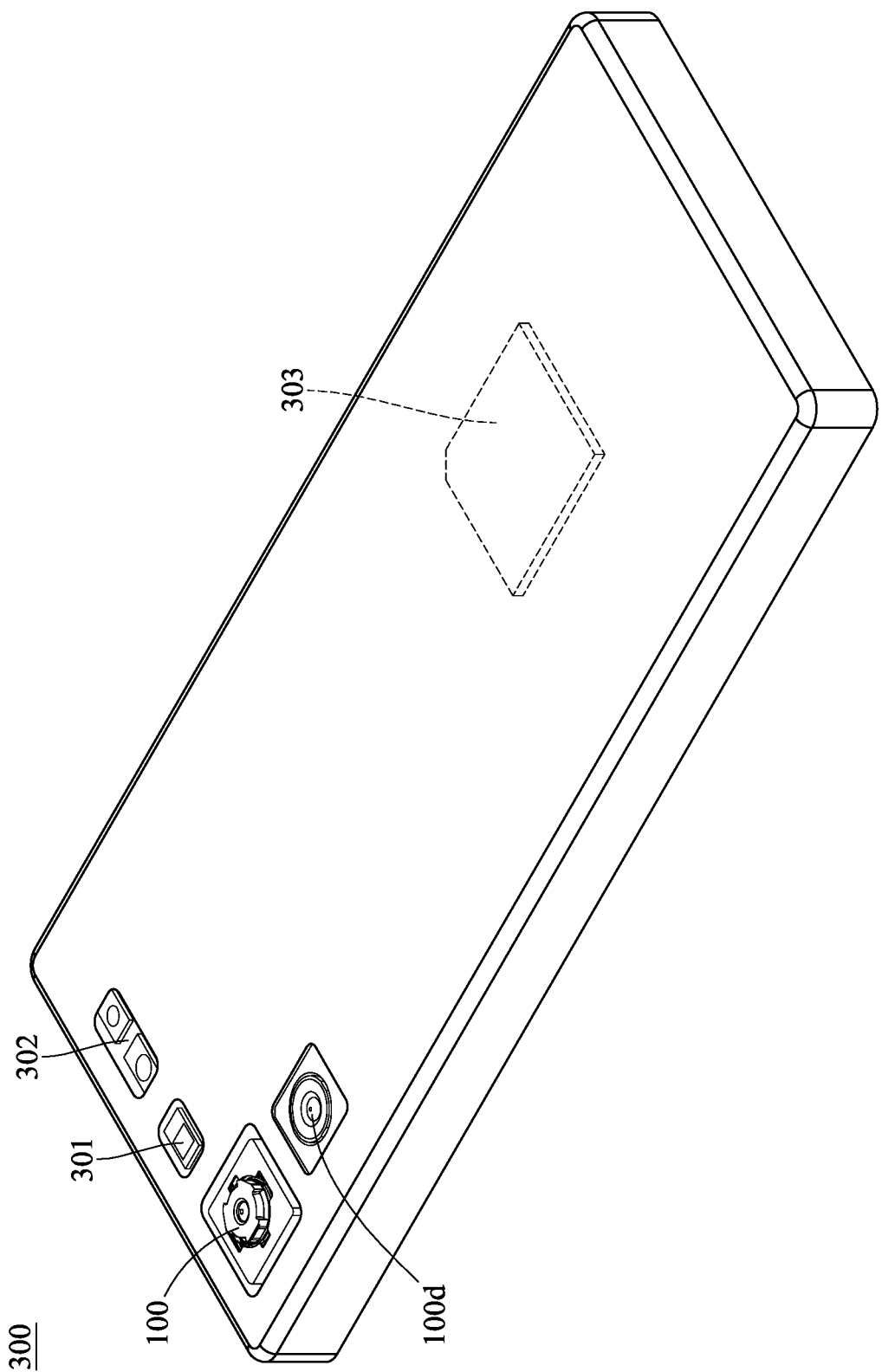
FIG. 18 is one perspective view of an electronic device according to the 10th embodiment of the present disclosure.
Figure 19:
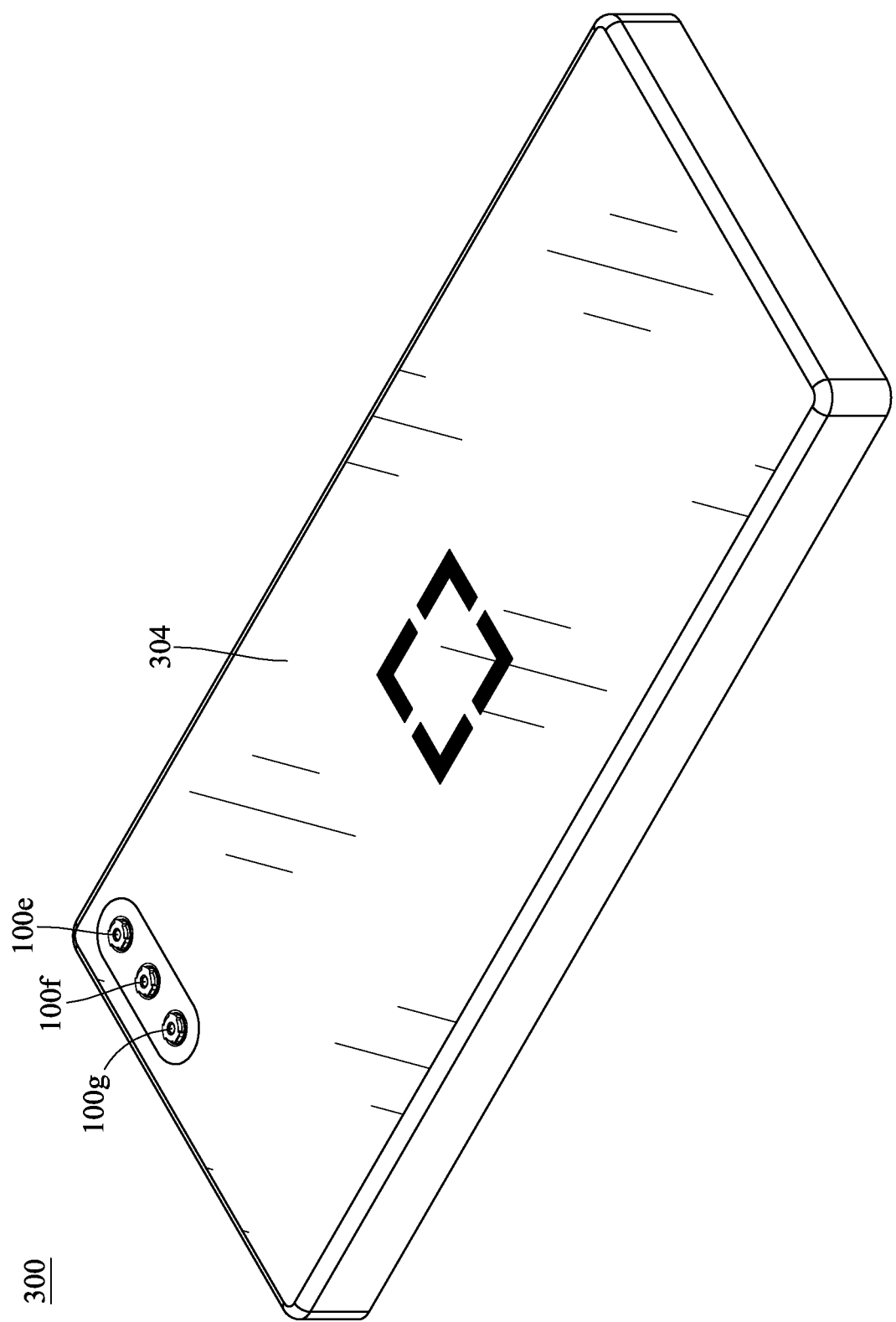
FIG. 19 is another perspective view of the electronic device in FIG. 18.
Figure 20:
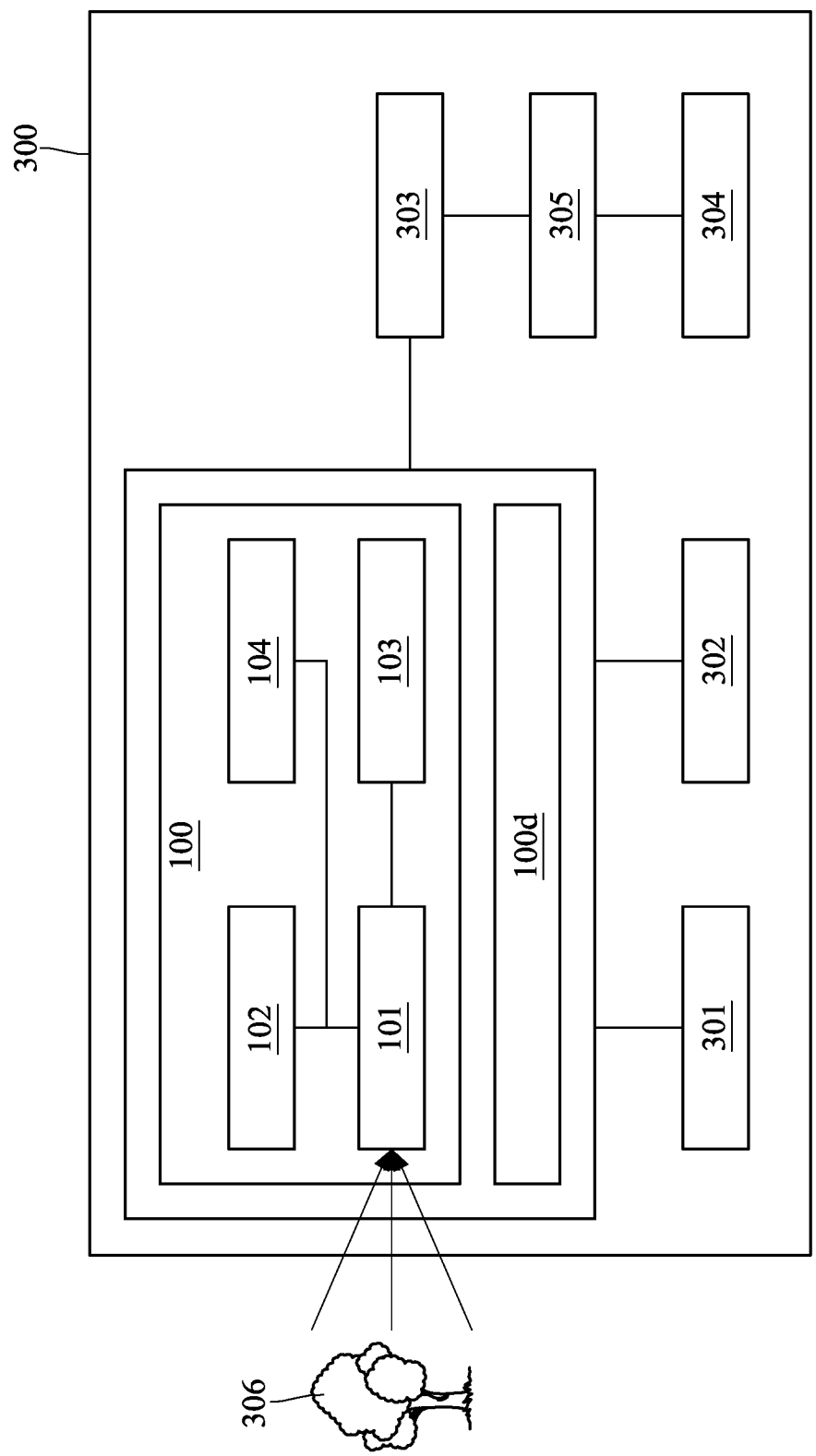
FIG. 20 is a block diagram of the electronic device in FIG. 18.

FIG. 18 is one perspective view of an electronic device according to the 10th embodiment of the present disclosure. FIG. 19 is another perspective view of the electronic device in FIG. 18. FIG. 20 is a block diagram of the electronic device in FIG. 18.

In this embodiment, an electronic device 300 is a smartphone including the image capturing unit 100 disclosed in the 8th embodiment, an image capturing unit 100d, an image capturing unit 100e, an image capturing unit 100f, an image capturing unit 100g, a flash module 301, a focus assist module 302, an image signal processor 303, a display module 304 and an image software processor 305. The image capturing unit 100 and the image capturing unit 100d are disposed on the same side of the electronic device 300. The focus assist module 302 can be a laser rangefinder or a ToF (time of flight) module, but the present disclosure is not limited thereto. The image capturing unit 100e, the image capturing unit 100f, the image capturing unit 100g and the display module 304 are disposed on the opposite side of the electronic device 300, and the display module 304 can be a user interface, such that the image capturing units 100e, 100f, 100g can be front-facing cameras of the electronic device 300 for taking selfies, but the present disclosure is not limited thereto. Furthermore, each of the image capturing units 100d, 100e, 100f and 100g can include the imaging optical lens system of the present disclosure and can have a configuration similar to that of the image capturing unit 100. In detail, each of the image capturing units 100d, 100e, 100f and 100g can include a lens unit, a driving device, an image sensor and an image stabilizer, and each of the lens unit can include an imaging optical lens system such as the imaging optical lens system of the present disclosure, a barrel and a holder member for holding the imaging optical lens system.

The image capturing unit 100 is a wide-angle image capturing unit, the image capturing unit 100d is an ultra-wide-angle image capturing unit, the image capturing unit 100e is a wide-angle image capturing unit, the image capturing unit 100f is an ultra-wide-angle image capturing unit, and the image capturing unit 100g is a ToF image capturing unit. In this embodiment, the image capturing units 100, 100d, 100e and 100f have different fields of view, such that the electronic device 300 can have various magnification ratios so as to meet the requirement of optical zoom functionality. In addition, the image capturing unit 100g can determine depth information of the imaged object. In this embodiment, the electronic device 300 includes multiple image capturing units 100, 100d, 100e, 100f and 100g, but the present disclosure is not limited to the number and arrangement of image capturing units.

When a user captures images of an object 306, the light rays converge in the image capturing unit 100 or the image capturing unit 100d to generate images, and the flash module 301 is activated for light supplement. The focus assist module 302 detects the object distance of the imaged object 306 to achieve fast auto focusing. The image signal processor 303 is configured to optimize the captured image to improve image quality. The light beam emitted from the focus assist module 302 can be either conventional infrared or laser. In addition, the light rays may converge in the image capturing unit 100e, 100f or 100g to generate images. The display module 304 can include a touch screen, and the user is able to interact with the display module 304 and the image software processor 305 having multiple functions to capture images and complete image processing. Alternatively, the user may capture images via a physical button. The image processed by the image software processor 305 can be displayed on the display module 304.

11th Embodiment

Figure 21:
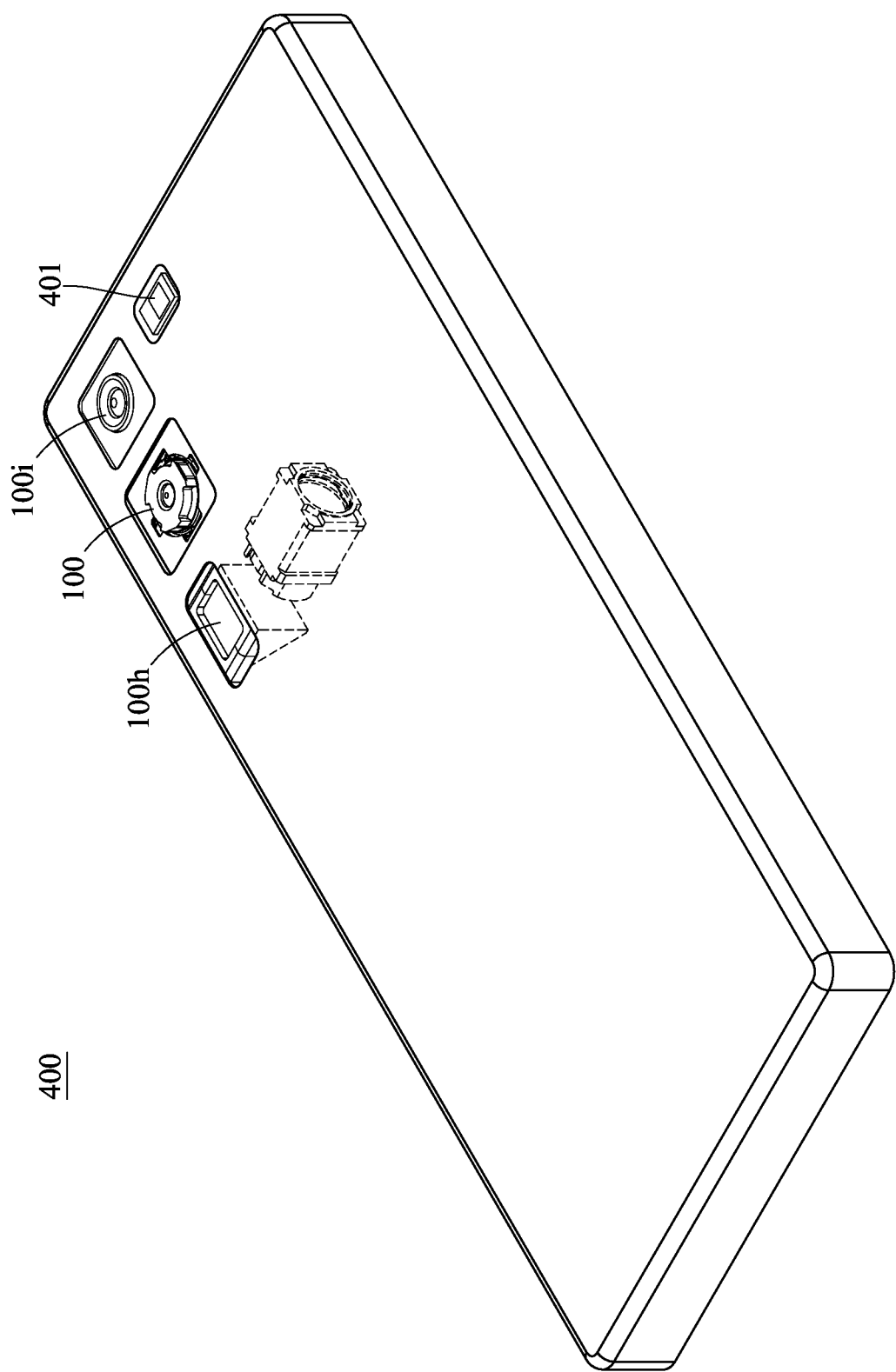
FIG. 21 is one perspective view of an electronic device according to the 11th embodiment of the present disclosure.

FIG. 21 is one perspective view of an electronic device according to the 11th embodiment of the present disclosure.

In this embodiment, an electronic device 400 is a smartphone including the image capturing unit 100 disclosed in the 8th embodiment, an image capturing unit 100h, an image capturing unit 100i, a flash module 401, a focus assist module, an image signal processor, a display module and an image software processor (not shown). The image capturing unit 100, the image capturing unit 100h and the image capturing unit 100i are disposed on the same side of the electronic device 400, while the display module is disposed on the opposite side of the electronic device 400. Furthermore, each of the image capturing units 100h and 100i can include the imaging optical lens system of the present disclosure and can have a configuration similar to that of the image capturing unit 100, and the details in this regard will not be provided again.

The image capturing unit 100 is a wide-angle image capturing unit, the image capturing unit 100h is a telephoto image capturing unit, and the image capturing unit 100i is an ultra-wide-angle image capturing unit. In this embodiment, the image capturing units 100, 100h and 100i have different fields of view, such that the electronic device 400 can have various magnification ratios so as to meet the requirement of optical zoom functionality. Moreover, the image capturing unit 100h can be a telephoto image capturing unit having a light-folding element configuration, such that the total track length of the image capturing unit 100h is not limited by the thickness of the electronic device 400. Moreover, the light-folding element configuration of the image capturing unit 100h can be similar to, for example, one of the structures shown in FIG. 28 to FIG. 30, which can be referred to foregoing descriptions corresponding to FIG. 28 to FIG. 30, and the details in this regard will not be provided again. In this embodiment, the electronic device 400 includes multiple image capturing units 100, 100h and 100i, but the present disclosure is not limited to the number and arrangement of image capturing units. When a user captures images of an object, light rays converge in the image capturing unit 100, 100h or 100i to generate images, and the flash module 401 is activated for light supplement. Further, the subsequent processes are performed in a manner similar to the abovementioned embodiment, so the details in this regard will not be provided again.

12th Embodiment

Figure 22:
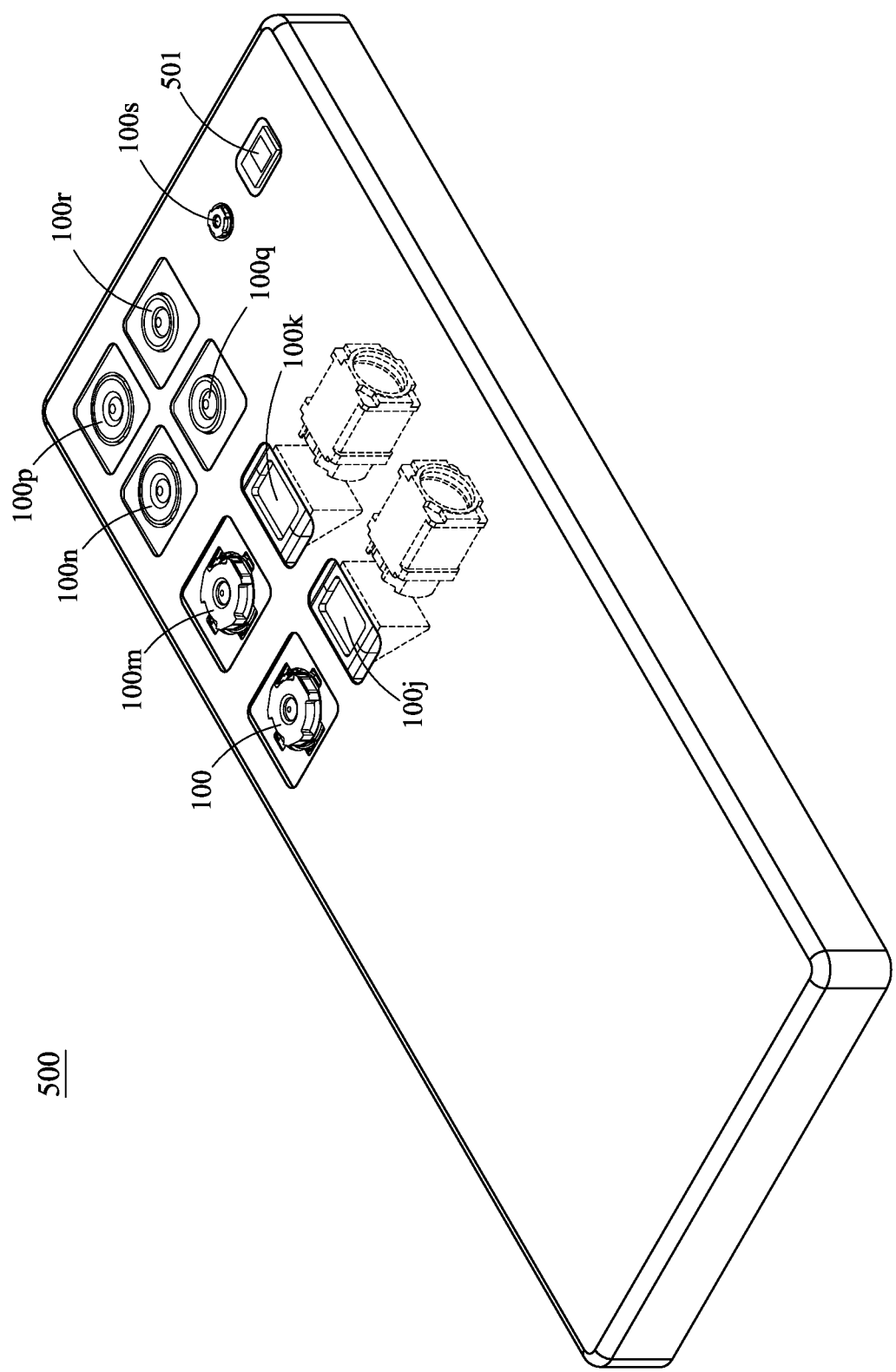
FIG. 22 is one perspective view of an electronic device according to the 12th embodiment of the present disclosure.

FIG. 22 is one perspective view of an electronic device according to the 12th embodiment of the present disclosure.

In this embodiment, an electronic device 500 is a smartphone including the image capturing unit 100 disclosed in the 8th embodiment, an image capturing unit 100j, an image capturing unit 100k, an image capturing unit 100m, an image capturing unit 100n, an image capturing unit 100p, an image capturing unit 100q, an image capturing unit 100r, an image capturing unit 100s, a flash module 501, a focus assist module, an image signal processor, a display module and an image software processor (not shown). The image capturing units 100, 100j, 100k, 100m, 100n, 100p, 100q, 100r and 100s are disposed on the same side of the electronic device 500, while the display module is disposed on the opposite side of the electronic device 500. Furthermore, each of the image capturing units 100j, 100k, 100m, 100n, 100p, 100q, 100r and 100s can include the imaging optical lens system of the present disclosure and can have a configuration similar to that of the image capturing unit 100, and the details in this regard will not be provided again.

The image capturing unit 100 is a wide-angle image capturing unit, the image capturing unit 100j is a telephoto image capturing unit, the image capturing unit 100k is a telephoto image capturing unit, the image capturing unit 100m is a wide-angle image capturing unit, the image capturing unit 100n is an ultra-wide-angle image capturing unit, the image capturing unit 100p is an ultra-wide-angle image capturing unit, the image capturing unit 100q is a telephoto image capturing unit, the image capturing unit 100r is a telephoto image capturing unit, and the image capturing unit 100s is a ToF image capturing unit. In this embodiment, the image capturing units 100, 100j, 100k, 100m, 100n, 100p, 100q and 100r have different fields of view, such that the electronic device 500 can have various magnification ratios so as to meet the requirement of optical zoom functionality. Moreover, each of the image capturing units 100j and 100k can be a telephoto image capturing unit having a light-folding element configuration. Moreover, the light-folding element configuration of each of the image capturing unit 100j and 100k can be similar to, for example, one of the structures shown in FIG. 28 to FIG. 30, which can be referred to foregoing descriptions corresponding to FIG. 28 to FIG. 30, and the details in this regard will not be provided again. In addition, the image capturing unit 100s can determine depth information of the imaged object. In this embodiment, the electronic device 500 includes multiple image capturing units 100, 100j, 100k, 100m, 100n, 100p, 100q, 100r and 100s, but the present disclosure is not limited to the number and arrangement of image capturing units. When a user captures images of an object, the light rays converge in the image capturing unit 100, 100j, 100k, 100m, 100n, 100p, 100q, 100r or 100s to generate images, and the flash module 501 is activated for light supplement. Further, the subsequent processes are performed in a manner similar to the abovementioned embodiments, and the details in this regard will not be provided again.

13th Embodiment

Figure 23:
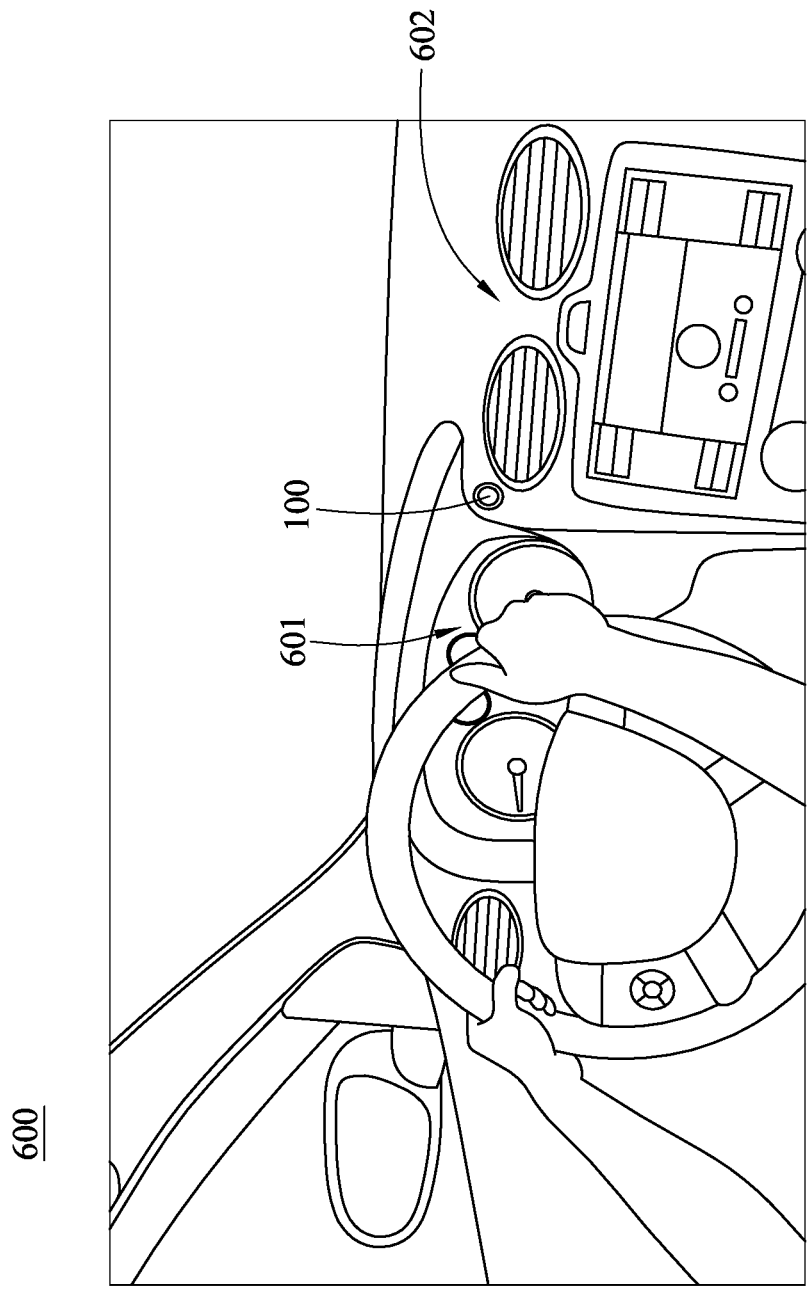
FIG. 23 is a partial view of an inner side of a vehicle device according to the 13th embodiment of the present disclosure.

FIG. 23 is a partial view of an inner side of a vehicle device according to the 13th embodiment of the present disclosure.

Figure 24:
FIG. 24 is a schematic view showing the image captured by the image capturing unit of the vehicle device in FIG. 23 when processing its detection function.

In this embodiment, the vehicle device 600 is an automobile. The vehicle device 600 includes the image capturing unit 100 disclosed in the 8th embodiment. The image capturing unit 100 is disposed adjacent to the dashboard 601 or center console 602 of the vehicle device 600, but the present disclosure is not limited thereto. The image capturing unit 100 can be used as a sensing lens towards the driver for being applied in a driver monitoring system, thereby detecting the driver's sobriety by determining the driver's gaze and blink or checking the driver's yawn and head position through the infrared lens. The image detected by the image capturing unit 100 can refer to FIG. 24, which is a schematic view showing the image captured by the image capturing unit of the vehicle device in FIG. 23 when processing its detection function. Therefore, it is favorable for detecting whether the driver is distracted, tired, dozing off or other dangerous driving, thereby sending a signal to the reminder or alarm (not shown) in the vehicle device 600 or a management system (not shown) in communication connection with the vehicle device 600.

14th Embodiment

Figure 25:
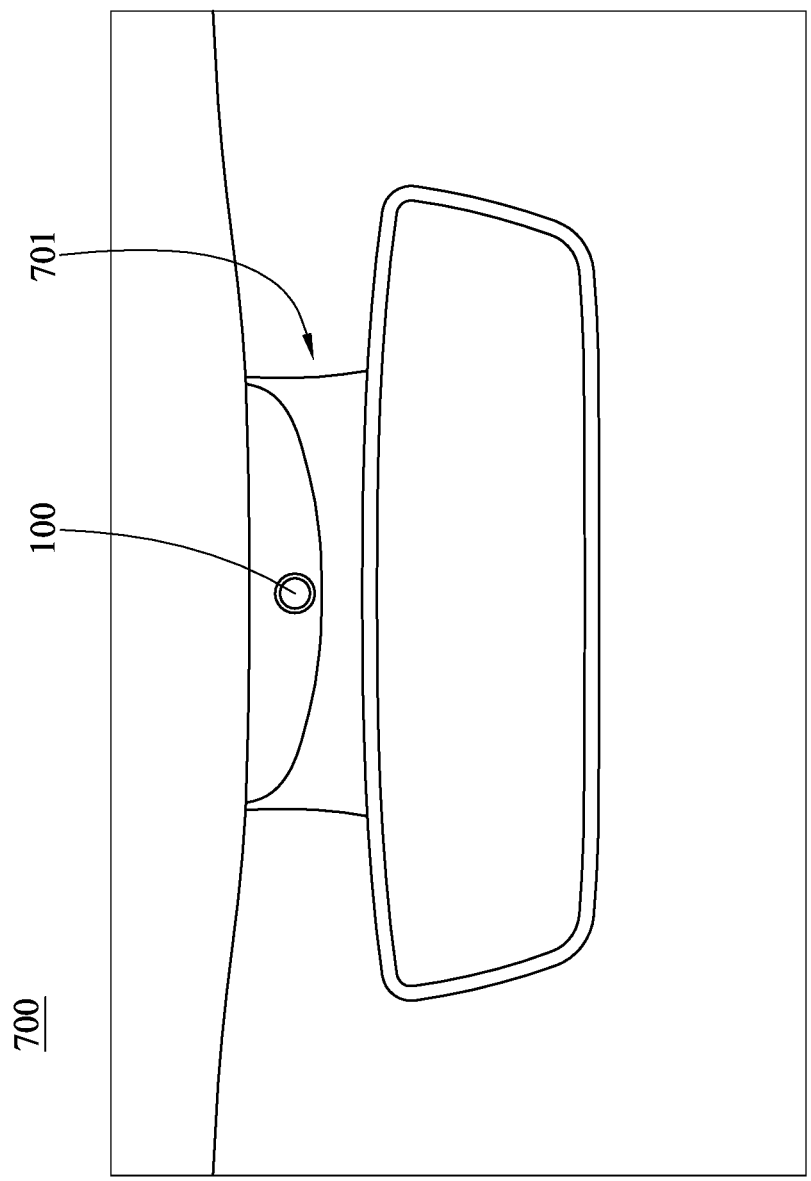
FIG. 25 is a partial view of an inner side of a vehicle device according to the 14th embodiment of the present disclosure.

FIG. 25 is a partial view of an inner side of a vehicle device according to the 14th embodiment of the present disclosure.

Figure 26:
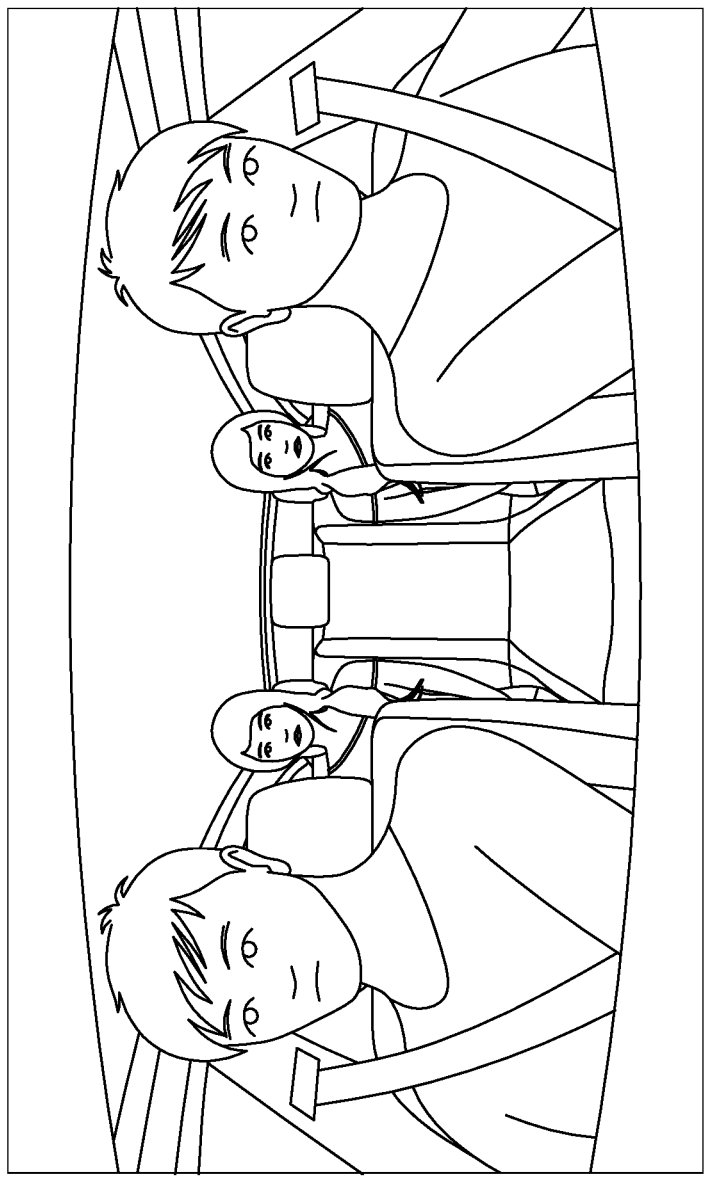
FIG. 26 is a schematic view showing the image captured by the image capturing unit of the vehicle device in FIG. 25 when processing its detection function.

In this embodiment, the vehicle device 700 is an automobile. The vehicle device 700 includes the image capturing unit 100 disclosed in the 8th embodiment. The image capturing unit 100 is disposed adjacent to the rear-view mirror 701 or center console (not shown) of the vehicle device 700, but the present disclosure is not limited thereto. The image capturing unit 100 can be used as a sensing lens towards the inner side of the vehicle device 700 so as to be applied to an occupancy monitoring system (OMS) for determining passenger's situations (especially child's behavior) at back seats based on images, thereby ensuring driving safety. The image determination for passenger's situation can be processed by using visible light in bright environment or infrared light in dark environment. The image capturing unit 100 can also be designed to determine people or objects in the vehicle device 700, such as children, mobile phones or luggage after the car door is opened. By doing so, the management system (not shown) in communication connection with the vehicle device 700 can be informed or the car windows of the vehicle device 700 can be rolled down when the image capturing unit 100 determines only a child is stayed in the vehicle device 700, thereby preventing the risk of heat stroke for the child. Or, the management system in communication connection with the vehicle device 700 can be informed when the image capturing unit 100 determines lost items or luggage in the vehicle device 700, thereby reducing time cost of the owner for finding the list items or luggage. The image detected by the image capturing unit 100 can refer to FIG. 26, which is a schematic view showing the image captured by the image capturing unit of the vehicle device in FIG. 25 when processing its detection function. Therefore, it is favorable for detecting the states of the people (may include the driver and passengers) or the objects in the vehicle device 700, such as the driver's sobriety, the passenger's gender, whether the seat belt is fastened, whether a child is stayed in the vehicle device 700, whether conflict is happened between the driver and passengers, other situation affecting normal driving, or whether lost items or luggage are left in the vehicle device 700, thereby sending a signal to the storage device (not shown) in the vehicle device 700 or the management system (not shown) in communication connection with the vehicle device 700.

Furthermore, the electronic device or the vehicle device according to the present disclosure can further include a temperature sensor (not shown) disposed adjacent to the image capturing unit for adjusting the focus of the lens based on the ambient temperature. Alternatively, the electronic device or the vehicle device according to the present disclosure can further include a heat dissipation mechanism disposed on the image capturing unit for preventing poor image quality due to the overheated image capturing unit. Note that the abovementioend heat dissipation mechanism can be a coating layer of high heat dissipation material such as diamond like carbon or graphene, and the abovementioend heat dissipation mechanism can also be designed to have microstructure with a high heat dissipation area so as to effectively enhance the heat dissipation effect.

The smartphone or vehicle in this embodiment is only exemplary for showing the image capturing unit of the present disclosure installed in an electronic device, and the present disclosure is not limited thereto. The image capturing unit can be optionally applied to optical systems with a movable focus. Furthermore, the imaging optical lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the second lens element has negative refractive power, the object-side surface of the second lens element is concave in a paraxial region thereof, at least one of the object-side surface and the image-side surface of the second lens element is aspheric, the object-side surface of the sixth lens element is concave in a paraxial region thereof, the image-side surface of the sixth lens element is concave in a paraxial region thereof, and the imaging optical lens system further comprises an aperture stop located between the second lens element and the third lens element;

wherein a focal length of the imaging optical lens system is f, a focal length of the first lens element is f1, an axial distance between the first lens element and the second lens element is T12, an axial distance between the second lens element and the third lens element is T23, and the following conditions are satisfied:

$-2.50<f/f1<0.15;$ $0.15<T23/f<2.30;$ and $0.15<T23/T12<1.80.$

2. The imaging optical lens system of claim 1, wherein a curvature radius of the object-side surface of the first lens element is R1, a curvature radius of the image-side surface of the first lens element is R2, and the following condition is satisfied:

$-0.30<(R1+R2)/(R1-R2)<5.30.$

3. The imaging optical lens system of claim 1, wherein the object-side surface of the second lens element has at least one inflection point, the focal length of the imaging optical lens system is f, a focal length of the second lens element is f2, and the following condition is satisfied:

$-2.30<f/f2<-0.2.$

4. The imaging optical lens system of claim 1, wherein the focal length of the imaging optical lens system is f, a composite focal length of the fifth lens element and the sixth lens element is f56, and the following condition is satisfied:

$-1.00<f/f56<0.20.$

5. The imaging optical lens system of claim 1, wherein the second lens element is made of plastic material, an axial distance between the aperture stop and an image surface is SL, an axial distance between the object-side surface of the first lens element and the image surface is TL, and the following condition is satisfied:

$0.20<SL/TL<0.70.$

6. The imaging optical lens system of claim 1, wherein at least one of the object-side surface and the image-side surface of the second lens element has at least one inflection point, a curvature radius of the image-side surface of the fifth lens element is R10, a curvature radius of the object-side surface of the sixth lens element is R11, and the following condition is satisfied:

$0.80<R10/R11<1.40.$

7. The imaging optical lens system of claim 1, wherein the focal length of the imaging optical lens system is f, a focal length of the seventh lens element is f7, an axial distance between the aperture stop and the object-side surface of the third lens element is Dsr5, an axial distance between the aperture stop and the image-side surface of the third lens element is Dsr6, and the following conditions are satisfied:

$-0.40<f/f7<0.40;$ and $0\le|Dsr5/Dsr6|<1.0.$

8. An image capturing unit, comprising:
the imaging optical lens system of claim 1; and
an image sensor disposed on an image surface of the imaging optical lens system.

9. An electronic device, comprising:
the image capturing unit of claim 8.

10. An imaging optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;

wherein the first lens element has negative refractive power, the second lens element has negative refractive power, the sixth lens element has negative refractive power, and the imaging optical lens system further comprises an aperture stop located between the second lens element and the third lens element;

wherein a central thickness of the first lens element is CT1, a central thickness of the sixth lens element is CT6, a central thickness of the seventh lens element is CT7, a sum of central thicknesses of all lens elements of the imaging optical lens system is ΣCT, an axial distance between the second lens element and the third lens element is T23, a focal length of the imaging optical lens system is f, a curvature radius of the object-side surface of the second lens element is R3, a curvature radius of the image-side surface of the second lens element is R4, and the following conditions are satisfied:

$0.00<CT1/\Sigma CT<0.30;$ $0.00<(CT6+CT7)/f<1.20;$ $0.15<T23/f<2.30;$ and $-5.75<(R3+R4)/(R3-R4)<0.90.$ 11. The imaging optical lens system of claim 10, wherein the focal length of the imaging optical lens system is f, a composite focal length of the fifth lens element and the sixth lens element is f56, and the following condition is satisfied:

$-1.00<f/f56<0.20.$

12. The imaging optical lens system of claim 10, wherein at least one of the object-side surface and the image-side surface of the second lens element has at least one inflection point, the object-side surface of the sixth lens element is concave in a paraxial region thereof, the image-side surface of the sixth lens element is concave in a paraxial region thereof, the axial distance between the second lens element and the third lens element is T23, the focal length of the imaging optical lens system is f, and the following condition is satisfied:

$0.40<T23/f<1.15.$

13. The imaging optical lens system of claim 10, wherein the focal length of the imaging optical lens system is f, a focal length of the seventh lens element is f7, and the following condition is satisfied:

$-0.28<f/f7<0.40.$

14. The imaging optical lens system of claim 10, wherein an axial distance between the first lens element and the second lens element is T12, the axial distance between the second lens element and the third lens element is T23, and the following condition is satisfied:

$$0.20 < T23/T12 < 5.00.$$

15. The imaging optical lens system of claim 10, wherein a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least two lens elements of the imaging optical lens system satisfying the following condition:

$$1.70 < Ni, \text{ wherein } i=1,2,3,4,5,6 \text{ or } 7.$$

16. The imaging optical lens system of claim 10, wherein a curvature radius of the object-side surface of the fifth lens element is R9, a curvature radius of the image-side surface of the fifth lens element is R10, and the following condition is satisfied:

$$-0.50 < (R9+R10)/(R9-R10) < 0.50.$$

17. The imaging optical lens system of claim 10, wherein the central thickness of the seventh lens element is CT7, the focal length of the imaging optical lens system is f, a curvature radius of the object-side surface of the seventh lens element is R13, a curvature radius of the image-side surface of the seventh lens element is R14, and the following conditions are satisfied:

$$0.10 < CT7/f < 0.80; \text{ and}$$

$$-11.00 < (R13+R14)/(R13-R14) < 0.45.$$

18. An imaging optical lens system comprising seven lens elements, the seven lens elements being, in order from an object side to an image side along an optical path, a first lens element, a second lens element, a third lens element, a fourth lens element, a fifth lens element, a sixth lens element and a seventh lens element, and each of the seven lens elements having an object-side surface facing toward the object side and an image-side surface facing toward the image side;
  wherein the first lens element has negative refractive power, the second lens element has negative refractive power, the sixth lens element has negative refractive power, the object-side surface of the sixth lens element is concave in a paraxial region thereof, the image-side surface of the sixth lens element is concave in a paraxial region thereof, and the imaging optical lens system further comprises an aperture stop located between the second lens element and the third lens element;
  wherein a central thickness of the sixth lens element is CT6, a central thickness of the seventh lens element is CT7, a focal length of the imaging optical lens system is f, an axial distance between the first lens element and the second lens element is T12, an axial distance between the second lens element and the third lens element is T23, a curvature radius of the object-side surface of the fourth lens element is R7, a curvature radius of the image-side surface of the fourth lens element is R8, and the following conditions are satisfied:

$$0.00 < (CT6+CT7)/f < 1.20;$$

$$0.15 < T23/T12 < 1.80; \text{ and}$$

$$(R7+R8)/(R7-R8) < 2.50.$$

19. The imaging optical lens system of claim 18, wherein an axial distance between the aperture stop and an image surface is SL, an axial distance between the object-side surface of the first lens element and the image surface is TL, an f-number of the imaging optical lens system is FNO, and the following conditions are satisfied:

$$0.45 < SL/TL < 0.70; \text{ and}$$

$$1.85 < FNO < 3.50.$$

20. The imaging optical lens system of claim 18, wherein a curvature radius of the object-side surface of the first lens element is R1, a curvature radius of the image-side surface of the first lens element is R2, and the following condition is satisfied:

$$-0.30 < (R1+R2)/(R1-R2) < 5.30.$$

21. The imaging optical lens system of claim 18, wherein a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the seventh lens element is N7, a refractive index of the i-th lens element is Ni, and at least two lens elements of the imaging optical lens system satisfying the following condition:

$$1.70 < Ni, \text{ wherein } i=1,2,3,4,5,6 \text{ or } 7.$$

22. The imaging optical lens system of claim 18, wherein the object-side surface of the second lens element has at least one inflection point, the focal length of the imaging optical lens system is f, a composite focal length of the fifth lens element and the sixth lens element is f56, and the following condition is satisfied:

$$-1.50 < f/f56 < 0.20.$$

23. The imaging optical lens system of claim 18, wherein a curvature radius of the object-side surface of the seventh lens element is R13, a curvature radius of the image-side surface of the seventh lens element is R14, and the following condition is satisfied:

$$-6.00 < (R13+R14)/(R13-R14) < 0.40.$$

24. The imaging optical lens system of claim 18, wherein the focal length of the imaging optical lens system is f, a focal length of the fifth lens element is f5, and the following condition is satisfied:

$$-0.10 < f/f5 < 0.75.$$

25. The imaging optical lens system of claim 18, wherein a central thickness of the first lens element is CT1, a sum of central thicknesses of all lens elements of the imaging optical lens system is ECT, and the following condition is satisfied:

$$0.00 < CT1/ECT < 0.30.$$

26. The imaging optical lens system of claim 18, wherein the focal length of the imaging optical lens system is f, a curvature radius of the object-side surface of the second lens element is R3, and the following condition is satisfied:

$$-0.80 < f/R3.$$

* * * * *